(12) United States Patent
Wang et al.

(10) Patent No.: US 7,570,813 B2
(45) Date of Patent: *Aug. 4, 2009

(54) STROKES LOCALIZATION BY M-ARRAY DECODING AND FAST IMAGE MATCHING

(75) Inventors: Jian Wang, Beijing (CN); Yingnong Dang, Beijing (CN); Qiang Wang, Beijing (CN); Liyong Chen, Beijing (CN); Xiaoxu Ma, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/845,584

(22) Filed: Aug. 27, 2007

(65) Prior Publication Data

US 2008/0025612 A1  Jan. 31, 2008

Related U.S. Application Data

(63) Continuation of application No. 10/759,357, filed on Jan. 16, 2004, now Pat. No. 7,263,224.

(51) Int. Cl.
*G06K 9/00* (2006.01)
(52) U.S. Cl. ................... 382/188; 345/179; 382/100
(58) Field of Classification Search ............. 382/188
See application file for complete search history.

(56) References Cited

U.S. PATENT DOCUMENTS

| 4,686,329 | A | 8/1987 | Joyce |
|---|---|---|---|
| 4,742,558 | A | 5/1988 | Ishibashi et al. |
| 4,745,269 | A | 5/1988 | Van Gils |
| 4,829,583 | A | 5/1989 | Monroe et al. |
| 4,941,124 | A | 7/1990 | Skinner, Jr. |

(Continued)

FOREIGN PATENT DOCUMENTS

CN  1303494  7/2001

(Continued)

OTHER PUBLICATIONS

Bernheim Brush, A.J. et al., "Robust Annotation Positioning in Digital Documents," SIGCHI '01, Mar. 31-Apr. 4, 2001, pp. 285-292, ACM, Seattle, WA, USA.

(Continued)

*Primary Examiner*—Samir A. Ahmed
*Assistant Examiner*—Tsung-Yin Tsai
(74) *Attorney, Agent, or Firm*—Perkins Coie LLP

(57) ABSTRACT

Systems and methods that determine a path of a pen tip as the pen tip is moved across a document are described. The document is watermarked with a maze pattern from which encoded position information is determined. A sequence of images is captured by a camera that is located in a pen. The path of the pen tip is determined by decoding the associated maze pattern and by matching the captured images with document images. If the position coordinates of any frame that is associated with a stroke cannot be determined from m-array decoding, the frames are transformed and then matched with an area of a document image. Once the position coordinates of at least one frame is determined, the position coordinates of other frames are determined by matching the frames in a neighboring area.

14 Claims, 20 Drawing Sheets

U.S. PATENT DOCUMENTS

| | | | |
|---|---|---|---|
| 5,032,924 A | 7/1991 | Brown et al. |
| 5,073,966 A | 12/1991 | Sato |
| 5,146,552 A | 9/1992 | Cassorla et al. |
| 5,153,928 A | 10/1992 | Iizuka |
| 5,181,257 A | 1/1993 | Steiner et al. |
| 5,196,875 A | 3/1993 | Stuckler |
| 5,235,654 A | 8/1993 | Anderson et al. |
| 5,243,149 A | 9/1993 | Comerford et al. |
| 5,247,137 A | 9/1993 | Epperson |
| 5,253,336 A | 10/1993 | Yamada |
| 5,288,986 A | 2/1994 | Pine et al. |
| 5,294,792 A | 3/1994 | Lewis et al. |
| 5,335,150 A | 8/1994 | Huang |
| 5,365,598 A | 11/1994 | Sklarew |
| 5,394,487 A | 2/1995 | Burger et al. |
| 5,398,082 A | 3/1995 | Henderson et al. |
| 5,414,227 A | 5/1995 | Schubert et al. |
| 5,442,147 A | 8/1995 | Burns et al. |
| 5,448,372 A | 9/1995 | Axman et al. |
| 5,450,603 A | 9/1995 | Davies |
| 5,454,054 A | 9/1995 | Iizuka |
| 5,471,533 A | 11/1995 | Wang et al. |
| 5,477,012 A | 12/1995 | Sekendur |
| 5,511,156 A | 4/1996 | Nagasaka |
| 5,581,637 A | 12/1996 | Cass et al. |
| 5,581,882 A | 12/1996 | Fowler et al. |
| 5,587,558 A | 12/1996 | Matsushima |
| 5,612,524 A | 3/1997 | Sant'Anselmo et al. |
| 5,626,620 A | 5/1997 | Kieval et al. |
| 5,629,499 A | 5/1997 | Flickinger et al. |
| 5,635,697 A | 6/1997 | Shellhammer et al. |
| 5,644,652 A | 7/1997 | Bellegarda et al. |
| 5,652,412 A | 7/1997 | Lazzouni et al. |
| 5,661,291 A | 8/1997 | Ahearn et al. |
| 5,661,506 A | 8/1997 | Lazzouni et al. |
| 5,670,897 A | 9/1997 | Kean |
| 5,686,718 A | 11/1997 | Iwai et al. |
| 5,692,073 A | 11/1997 | Cass |
| 5,719,884 A | 2/1998 | Roth et al. |
| 5,721,940 A | 2/1998 | Luther et al. |
| 5,726,435 A | 3/1998 | Hara et al. |
| 5,727,098 A | 3/1998 | Jacobson |
| 5,754,280 A | 5/1998 | Kato et al. |
| 5,756,981 A | 5/1998 | Roustaei et al. |
| 5,765,176 A | 6/1998 | Bloomberg |
| 5,774,602 A | 6/1998 | Taguchi et al. |
| 5,817,992 A | 10/1998 | D'Antonio |
| 5,818,436 A | 10/1998 | Imai et al. |
| 5,822,436 A * | 10/1998 | Rhoads ................. 380/54 |
| 5,822,465 A | 10/1998 | Normile et al. |
| 5,825,015 A | 10/1998 | Chan |
| 5,825,892 A | 10/1998 | Braudaway et al. |
| 5,850,058 A | 12/1998 | Tano et al. |
| 5,852,434 A | 12/1998 | Sekendur |
| 5,855,483 A | 1/1999 | Collins et al. |
| 5,855,594 A | 1/1999 | Olive et al. |
| 5,875,264 A * | 2/1999 | Carlstrom ............... 382/181 |
| 5,890,177 A | 3/1999 | Moody et al. |
| 5,897,648 A | 4/1999 | Henderson |
| 5,898,166 A | 4/1999 | Fukuda et al. |
| 5,902,968 A | 5/1999 | Sato et al. |
| 5,937,110 A | 8/1999 | Petrie et al. |
| 5,939,703 A | 8/1999 | Hecht et al. |
| 5,960,124 A | 9/1999 | Taguchi et al. |
| 5,961,571 A * | 10/1999 | Gorr et al. .................. 701/207 |
| 5,995,084 A | 11/1999 | Chan et al. |
| 6,000,614 A | 12/1999 | Yang et al. |
| 6,000,621 A | 12/1999 | Hecht et al. |
| 6,000,946 A | 12/1999 | Snyders et al. |
| 6,005,973 A | 12/1999 | Seybold et al. |
| 6,041,335 A | 3/2000 | Merritt et al. |
| 6,044,165 A | 3/2000 | Perona et al. |
| 6,044,301 A | 3/2000 | Hartlaub et al. |
| 6,052,481 A | 4/2000 | Grajski et al. |
| 6,054,990 A | 4/2000 | Tran |
| 6,076,734 A | 6/2000 | Dougherty et al. |
| 6,081,261 A | 6/2000 | Wolff et al. |
| 6,108,453 A | 8/2000 | Acharya |
| 6,141,014 A | 10/2000 | Endo et al. |
| 6,151,424 A * | 11/2000 | Hsu ........................... 382/294 |
| 6,157,935 A | 12/2000 | Tran et al. |
| 6,181,329 B1 | 1/2001 | Stork et al. |
| 6,186,405 B1 | 2/2001 | Yoshioka |
| 6,188,392 B1 | 2/2001 | O'Connor et al. |
| 6,192,380 B1 | 2/2001 | Light et al. |
| 6,202,060 B1 | 3/2001 | Tran |
| 6,208,771 B1 | 3/2001 | Jared et al. |
| 6,208,894 B1 | 3/2001 | Schulman et al. |
| 6,219,149 B1 | 4/2001 | Kawata et al. |
| 6,226,636 B1 | 5/2001 | Abdel-Mottaleb et al. |
| 6,230,304 B1 * | 5/2001 | Groeneveld et al. ............ 716/7 |
| 6,243,071 B1 | 6/2001 | Shwarts et al. |
| 6,249,614 B1 | 6/2001 | Kolesnik et al. |
| 6,254,253 B1 | 7/2001 | Daum et al. |
| 6,256,398 B1 | 7/2001 | Chang |
| 6,259,827 B1 * | 7/2001 | Nichani ..................... 382/291 |
| 6,278,968 B1 | 8/2001 | Franz et al. |
| 6,294,775 B1 | 9/2001 | Seibel et al. |
| 6,310,988 B1 | 10/2001 | Flores et al. |
| 6,327,395 B1 | 12/2001 | Hecht et al. |
| 6,330,976 B1 | 12/2001 | Dymetman et al. |
| 6,335,727 B1 | 1/2002 | Morishita et al. |
| 6,340,119 B2 | 1/2002 | He et al. |
| 6,396,598 B1 * | 5/2002 | Kashiwagi et al. .......... 358/474 |
| 6,408,330 B1 | 6/2002 | DeLaHuerga |
| 6,441,920 B1 | 8/2002 | Smith |
| 6,479,768 B1 | 11/2002 | How |
| 6,492,981 B1 | 12/2002 | Stork et al. |
| 6,517,266 B2 | 2/2003 | Saund |
| 6,522,928 B2 | 2/2003 | Whitehurst et al. |
| 6,532,152 B1 | 3/2003 | White et al. |
| 6,538,187 B2 | 3/2003 | Beigi |
| 6,546,136 B1 | 4/2003 | Hull |
| 6,551,357 B1 | 4/2003 | Madduri |
| 6,560,741 B1 | 5/2003 | Gerety et al. |
| 6,570,104 B1 | 5/2003 | Ericson et al. |
| 6,570,997 B2 | 5/2003 | Noguchi |
| 6,573,887 B1 * | 6/2003 | O'Donnell, Jr. ............. 345/179 |
| 6,577,299 B1 | 6/2003 | Schiller et al. |
| 6,580,424 B1 | 6/2003 | Krumm |
| 6,584,052 B1 | 6/2003 | Phillips et al. |
| 6,585,154 B1 | 7/2003 | Ostrover et al. |
| 6,592,039 B1 | 7/2003 | Smith et al. |
| 6,603,464 B1 | 8/2003 | Rabin |
| 6,625,313 B1 | 9/2003 | Morita et al. |
| 6,628,267 B2 | 9/2003 | Karidis et al. |
| 6,650,320 B1 | 11/2003 | Zimmerman |
| 6,655,597 B1 | 12/2003 | Swartz et al. |
| 6,661,920 B1 | 12/2003 | Skinner |
| 6,663,008 B1 | 12/2003 | Pettersson et al. |
| 6,671,386 B1 | 12/2003 | Shimizu et al. |
| 6,674,427 B1 | 1/2004 | Pettersson et al. |
| 6,681,045 B1 | 1/2004 | Lapstun et al. |
| 6,686,910 B2 | 2/2004 | O'Donnell, Jr. |
| 6,689,966 B2 | 2/2004 | Wiebe |
| 6,693,615 B2 | 2/2004 | Hill et al. |
| 6,697,056 B1 | 2/2004 | Bergelson et al. |
| 6,728,000 B1 | 4/2004 | Lapstun et al. |
| 6,729,543 B1 | 5/2004 | Arons et al. |
| 6,731,271 B1 | 5/2004 | Tanaka et al. |
| 6,732,927 B2 | 5/2004 | Olsson et al. |
| 6,738,053 B1 | 5/2004 | Borgström et al. |
| 6,744,967 B2 | 6/2004 | Kaminski et al. |
| 6,752,317 B2 | 6/2004 | Dymetman et al. |

| | | | |
|---|---|---|---|
| 6,760,009 B2 | 7/2004 | Omura et al. |
| 6,783,069 B1 | 8/2004 | Hecht et al. |
| 6,819,776 B2 | 11/2004 | Chang |
| 6,831,273 B2 | 12/2004 | Jenkins et al. |
| 6,832,724 B2 | 12/2004 | Yavid et al. |
| 6,834,081 B2 | 12/2004 | Kim et al. |
| 6,834,195 B2 | 12/2004 | Brandenberg et al. |
| 6,834,337 B1 | 12/2004 | Brady et al. |
| 6,847,356 B1 | 1/2005 | Hasegawa et al. |
| 6,856,712 B2 | 2/2005 | Fauver et al. |
| 6,862,371 B2 | 3/2005 | Mukherjee |
| 6,864,880 B2 | 3/2005 | Hugosson et al. |
| 6,865,325 B2 | 3/2005 | Ide et al. |
| 6,870,966 B1 | 3/2005 | Silverbrook et al. |
| 6,879,731 B2 | 4/2005 | Kang et al. |
| 6,880,124 B1 | 4/2005 | Moore |
| 6,897,854 B2 | 5/2005 | Keely et al. |
| 6,898,297 B2 | 5/2005 | Katsura et al. |
| 6,929,183 B2 | 8/2005 | Pettersson |
| 6,933,933 B2 | 8/2005 | Fleming |
| 6,938,222 B2 | 8/2005 | Hullender et al. |
| 6,956,968 B1 | 10/2005 | O'Dell et al. |
| 6,960,777 B2 | 11/2005 | Soar |
| 6,964,483 B2 | 11/2005 | Wang et al. |
| 6,968,083 B2 | 11/2005 | Williams et al. |
| 6,975,334 B1 | 12/2005 | Barrus |
| 6,976,220 B1 | 12/2005 | Lapstun et al. |
| 6,992,655 B2 | 1/2006 | Ericson et al. |
| 6,999,622 B2 | 2/2006 | Komatsu |
| 7,003,150 B2 | 2/2006 | Trajković |
| 7,009,594 B2 | 3/2006 | Wang et al. |
| 7,012,621 B2 | 3/2006 | Crosby et al. |
| 7,024,429 B2 | 4/2006 | Ngo et al. |
| 7,036,938 B2 | 5/2006 | Wang et al. |
| 7,048,198 B2 | 5/2006 | Ladas et al. |
| 7,110,604 B2 | 9/2006 | Olsson |
| 7,111,230 B2 | 9/2006 | Euchner et al. |
| 7,116,840 B2 | 10/2006 | Wang et al. |
| 7,119,816 B2 | 10/2006 | Zhang et al. |
| 7,123,742 B2 | 10/2006 | Chang |
| 7,133,031 B2 | 11/2006 | Wang et al. |
| 7,133,563 B2 | 11/2006 | Wang et al. |
| 7,136,054 B2 * | 11/2006 | Wang et al. ............... 345/179 |
| 7,139,740 B2 | 11/2006 | Ayala |
| 7,142,197 B2 | 11/2006 | Wang et al. |
| 7,142,257 B2 | 11/2006 | Callison et al. |
| 7,145,556 B2 | 12/2006 | Pettersson |
| 7,167,164 B2 | 1/2007 | Ericson et al. |
| 7,176,906 B2 | 2/2007 | Williams et al. |
| 7,222,799 B2 | 5/2007 | Silverbrook |
| 7,262,764 B2 | 8/2007 | Wang et al. |
| 7,263,224 B2 | 8/2007 | Wang et al. |
| 7,289,103 B2 | 10/2007 | Lapstun et al. |
| 7,293,240 B2 | 11/2007 | Lapstun et al. |
| 7,295,193 B2 | 11/2007 | Fahraeus |
| 7,330,605 B2 | 2/2008 | Wang et al. |
| 7,386,191 B2 | 6/2008 | Wang et al. |
| 7,400,777 B2 | 7/2008 | Wang et al. |
| 7,403,658 B2 | 7/2008 | Lin et al. |
| 7,421,439 B2 | 9/2008 | Wang et al. |
| 7,430,497 B2 | 9/2008 | Wang et al. |
| 7,440,134 B2 | 10/2008 | Natori |
| 7,463,784 B2 | 12/2008 | Kugo |
| 7,477,784 B2 | 1/2009 | Wang et al. |
| 7,486,822 B2 | 2/2009 | Wang et al. |
| 7,486,823 B2 | 2/2009 | Wang et al. |
| 7,502,508 B2 | 3/2009 | Wang et al. |
| 2001/0037132 A1 | 11/2001 | Whitehurst et al. |
| 2001/0038383 A1 | 11/2001 | Ericson et al. |
| 2001/0053238 A1 * | 12/2001 | Katsura et al. ............ 382/100 |
| 2002/0028018 A1 | 3/2002 | Hawkins et al. |
| 2002/0031622 A1 | 3/2002 | Ippel et al. |
| 2002/0048404 A1 | 4/2002 | Fahraeus et al. |
| 2002/0050982 A1 | 5/2002 | Ericson |
| 2002/0069220 A1 | 6/2002 | Tran |
| 2002/0163511 A1 | 11/2002 | Sekendur |
| 2002/0179717 A1 | 12/2002 | Cummings et al. |
| 2003/0001020 A1 | 1/2003 | Kardach |
| 2003/0009725 A1 | 1/2003 | Reichenbach |
| 2003/0030638 A1 | 2/2003 | Astrom et al. |
| 2003/0034961 A1 | 2/2003 | Kao |
| 2003/0050803 A1 * | 3/2003 | Marchosky ............... 705/3 |
| 2003/0081000 A1 | 5/2003 | Watanabe et al. |
| 2003/0088781 A1 | 5/2003 | ShamRao |
| 2003/0090475 A1 | 5/2003 | Paul et al. |
| 2003/0117378 A1 | 6/2003 | Carro |
| 2003/0128194 A1 | 7/2003 | Pettersson |
| 2003/0146883 A1 | 8/2003 | Zelitt |
| 2003/0159044 A1 | 8/2003 | Doyle et al. |
| 2003/0179906 A1 | 9/2003 | Baker et al. |
| 2003/0214553 A1 | 11/2003 | Dodge |
| 2003/0214669 A1 | 11/2003 | Saitoh |
| 2004/0032393 A1 | 2/2004 | Brandenberg et al. |
| 2004/0046744 A1 | 3/2004 | Rafii et al. |
| 2004/0085302 A1 * | 5/2004 | Wang et al. ............... 345/181 |
| 2004/0086181 A1 | 5/2004 | Wang et al. |
| 2004/0090429 A1 | 5/2004 | Geaghan et al. |
| 2004/0128264 A1 | 7/2004 | Leung et al. |
| 2004/0153649 A1 | 8/2004 | Rhoads et al. |
| 2004/0212553 A1 | 10/2004 | Wang et al. |
| 2004/0233163 A1 | 11/2004 | Lapstun et al. |
| 2005/0024324 A1 | 2/2005 | Tomasi et al. |
| 2005/0044164 A1 | 2/2005 | O'Farrell et al. |
| 2005/0052700 A1 | 3/2005 | Mackenzie et al. |
| 2005/0104909 A1 | 5/2005 | Okamura et al. |
| 2005/0106365 A1 | 5/2005 | Palmer et al. |
| 2005/0146518 A1 * | 7/2005 | Wang et al. ............... 345/179 |
| 2005/0147281 A1 | 7/2005 | Wang et al. |
| 2005/0193292 A1 | 9/2005 | Lin et al. |
| 2006/0109263 A1 | 5/2006 | Wang et al. |
| 2006/0123049 A1 | 6/2006 | Wang et al. |
| 2006/0182309 A1 | 8/2006 | Wang et al. |
| 2006/0182343 A1 | 8/2006 | Lin et al. |
| 2006/0190818 A1 | 8/2006 | Wang et al. |
| 2006/0204101 A1 | 9/2006 | Wang et al. |
| 2006/0215913 A1 | 9/2006 | Wang et al. |
| 2006/0242560 A1 | 10/2006 | Wang et al. |
| 2006/0242562 A1 | 10/2006 | Wang et al. |
| 2006/0242622 A1 | 10/2006 | Wang et al. |
| 2006/0274948 A1 | 12/2006 | Wamg et al. |
| 2007/0001950 A1 | 1/2007 | Zhang et al. |
| 2007/0003150 A1 | 1/2007 | Xu et al. |
| 2007/0041654 A1 | 2/2007 | Wang et al. |
| 2007/0042165 A1 | 2/2007 | Wang et al. |

FOREIGN PATENT DOCUMENTS

| | | |
|---|---|---|
| CN | 1352778 | 6/2002 |
| CN | 3143455 | 9/2003 |
| CN | 200610092487 | 9/2003 |
| EP | 0407734 | 1/1991 |
| EP | 0439682 | 8/1991 |
| EP | 0564708 | 10/1993 |
| EP | 0670555 | 9/1995 |
| EP | 0694870 | 1/1996 |
| EP | 0717368 | 6/1996 |
| EP | 0732666 | 9/1996 |
| EP | 0865166 | 9/1998 |
| EP | 1154377 | 11/2001 |
| EP | 1158456 | 11/2001 |
| EP | 1168231 | 1/2002 |
| EP | 1276073 | 1/2003 |
| EP | 1416435 | 5/2004 |
| GB | 2393149 | 3/2004 |
| JP | 63165584 | 7/1988 |
| JP | 04253087 | 9/1992 |

| | | |
|---|---|---|
| JP | 06006316 | 1/1994 |
| JP | 06209482 | 7/1994 |
| JP | 06230886 | 8/1994 |
| JP | 07020812 | 1/1995 |
| JP | 07225564 | 8/1995 |
| JP | 10215450 | 8/1998 |
| JP | 11308112 | 11/1999 |
| JP | 2000131640 | 5/2000 |
| JP | 2002529796 | 9/2000 |
| JP | 2002082763 | 3/2002 |
| JP | 2002108551 | 4/2002 |
| WO | WO-9630217 | 10/1996 |
| WO | WO-9960469 | 11/1999 |
| WO | 9965568 A1 | 12/1999 |
| WO | WO-0025293 | 5/2000 |
| WO | WO-0072247 | 11/2000 |
| WO | WO-0073983 | 12/2000 |
| WO | WO-0126032 | 4/2001 |
| WO | WO-0148685 | 7/2001 |
| WO | WO-0171654 | 9/2001 |
| WO | WO-02077870 | 10/2002 |
| WO | WO-2005106638 | 11/2005 |

OTHER PUBLICATIONS

Clark, Douglas W. et al., "Maximal and Near-Maximal Shift Register Sequences: Efficient Event Counters and Easy Discrete Logarithms," IEEE Transaction on Computers 43, May 1994, pp. 1-23, USA.
Decurtins, Corsin et al., "Digital Annotation of Printed Documents," CIKM '03, Nov. 3-8, 2003, pp. 552-555, ACM, New Orleans, LA, USA.
Dumer, Ilya et al., "Hardness of Approximating the Minimum of a Linear Code," 1999, pp. 475-484, IEEE, USA.
Golovchinsky, Gene et al., "Moving Markup: Repositioning Freeform Annotations," UIST '02, Oct. 27-30, 2002, pp. 21-24, ACM, Paris, France.
U.S. Appl. No. 10/849,249, Wang.
U.S. Appl. No. 11/066,800, Wang.
U.S. Appl. No. 11/067,193, Yang.
U.S. Appl. No. 11/089,189, Wang.
U.S. Appl. No. 11/142,844, Wang.
U.S. Appl. No. 12/131,810, Wang.
U.S. Appl. No. 12/138,339, Wang.
U.S. Appl. No. 12/180,484, Wang.
"VPEN, Revolutionizing Human Interaction With The Digital World™," OTM Technologies, pp. 1-6, Jul. 15, 2002.
Cai, Z., "A New Decode Algorithm for Binary Bar Codes," Pattern Recognition Letters 15 (Dec. 1994), pp. 1191-1199.
Champaneria, "PADCAM: A Real-Time, Human-Centric Notetaking System," MIT Laboratory for Computer Science, Mar. 2002.
Cotting, D. et al., "Embedding Imperceptible Patterns into Projected Images for Simultaneous Acquisition and Display," Proceedings of the Third IEEE and ACM International Symposium on Mixed and Augmented Reality, Nov. 2-5, 2004, IEEE Computer Society, Washington, DC, pp. 100-109.
Crowley et al., "Things That See," Communications of the A.C.M., vol. 43, No. 3, pp. 54-64, Mar. 2000.
Dey, et al., "A Fast Algorithm for Computing the Euler Number of an Image and its VLSI Implementation," IEEE; 13th International Conference on VLSI Design, Jan. 2003.
European Search Report for Application No. EP 03021235; Applicant: Microsoft Corporation; Date of Mailing: Jun. 1, 2005 (2 pages).
European Search Report for Application No. EP 03021852; Applicant: Microsoft Corporation; Date of Mailing: Mar. 2, 2004 (3 pages).
European Search Report for Application No. EP 05000170.0-1527; Applicant: Microsoft Corporation; Date of Mailing: Jan. 6, 2005 (7 pages).
European Search Report for Application No. 03021224.5; Applicant: Microsoft Corporation; Date of Mailing: Jun. 1, 2005 (3 pages).
European Search Report for Application No. 03021236.9; Applicant: Microsoft Corporation; Date of Mailing: Sep. 16, 2005 (5 pages).

European Search Report for Application No. 03021237.7-1527, Applicant: Microsoft Corporation; Date of Mailing: Jan. 6, 2005 (4 pages).
European Search Report for Application No. EP050000749; Applicant: Microsoft Corporation; Date of Mailing: Apr. 26, 2007 (2 pages).
European Search Report, Application No. 03021238.5-1527; Applicant: Microsoft Corporation; Date of Mailing: Jun. 1, 2005 (6 pages).
Fujieda et al., "Development Of Pen-Shaped Scanner," Nec, vol. 51, No. 10, 1998.
Gonzalez, Rafael et al., "Digital Image Processing," Table of Contents and Preface, Second Edition, Prentice Hall, Upper Saddle River, New Jersey, 2002 (13 pages).
Grasso et al., "Augmenting Recommender Systems by Embedding Interfaces into Practices," pp. 267-275, 1999.
Guerrero, J.J. and Sagues, C. "From Lines to Homographies Between Uncalibrated Images," IX Symposium on Pattern Recognition and Image Analysis, VO4, 233-240, 2001.
Haynes, "Wacom PL-500," www.wacom.co.uk, Jul. 15, 2002.
Hecht, D.L., "Printed embedded data graphical user interfaces," Computer vol. 34, Issue 3, Mar. 2001, pp. 47-55.
IEEExplore # Search Session History, May 7, 2008, http://ieee.org/search/history.jsp, 1 page.
International Search Report for Application No. PCT/US2006/032230; Applicant: Microsoft Corporation; Date of Mailing: Jan. 9, 2007 (3 pages).
Internet Print Out: "(Electro-Magnetic Resonance) send and position sensing technology," Wacom, Technology, http://www.wacom-components.com/tech.asp, pp. 1-6, Jul. 15, 2002.
Internet Print Out: "Anoto Pen Bluetooth," Tabletpccorner, http://www.tabletpccorner.net, dated Sep. 5, 2003.
Internet Print Out: "Competitive Technologies' Investee Introduces N-Scribe Pen—Digital Ink Presents Wireless Pen At Demo 2001," Competitive Technologies, http://www.competitivetech, dated Sep. 5, 2003.
Internet Print Out: "Cordless Batteryless Pen," Wacom Penabled, Components, http://www.wacom.com/components/index.cfm, dated Jul. 15, 2002.
Internet Print Out: "DataGlyphs®: Embedding Digital Data," Parc Solutions, http://www.parc.com/solutions/dataglyphs/, dated Jul. 15, 2002.
Internet Print Out: "Digital Pens," http://www.anotofunctionality.com/navigate.asp?PageID=96, pp. 1-70, Sep. 26, 2002.
Internet Print Out: "Jot This—Nscribe Pen," PC Magazine, http://ww.pcmag.com/article2/0,4149,316500,00.asp, dated Jul. 15, 2002.
Internet Print Out: "Jot This—Nscribe Pen," PC Magazine, http://ww.pcmag.com/article2/0,4149,316500,00.asp, dated Sep. 5, 2003.
Internet Print Out: "Maxell Digital Pen To Use Anoto System," Gizmo, http://www.gizmo.com.au/, dated Sep. 5, 2003.
Internet Print Out: "Mimio—Products," Mimio, http://www.mimio.com/pp. 1-8, Sep. 5, 2003.
Internet Print Out: "N-Scribe For Digital Writing," Flash Commerce News, http://flashcommerce.com/articles/, dated Sep. 5, 2003.
Internet Print Out: "N-Scribe For Digital Writing," Mobileinfo.com, News issue #2001—15 (Apr. 2001), http://www.mobileinfo.com/News_2001/Issue15/Digital-nscribe.htm, dated Jul. 15, 2002.
Internet Print Out: "Navilite—Optical Opportunities—Bluetooth-enabled optical transition measurement technology paves the way for an untethered stylus that can write on any surface," vol. 8, Issue No. 34, Jul. 5-11, 2002. www.computerworld.com, dated Aug. 15, 2002.
Internet Print Out: "OTM Technologies—V Pen," searched http://www.otmtech.com/vpen3.asp, pp. 1-7, Jul. 15, 2002.
Internet Print Out: "PL-500—15.1 inch Screen Digital LCD Pen Tablet System," Wacom Graphics Tablet Solution, http://ap.wacm.co.jp/products/pl/contents/pl500.html, pp. 1-13, 2002.
Internet Print Out: "Preprocessing in the Npen++ System," http://www.is.cs.cmu.edu/mie/multimodal_npen_preproc.html, dated Aug. 8, 2002.
Internet Print Out: "RF Pen Sends Your Scribbles," Appliance Manufacturing Magazine, http://www.ammagazine.com. Dated Sep. 26, 2002.
Internet Print Out: "SMART Board Interactive Whiteboard," Smarttech, http://www.smarttech.com, pp. 1-26, Sep. 5, 2003.

Internet Print Out: "The Hot New Medium: Paper—How The Oldest Interface In The Books is Redrawing The Map Of The Networked World," http://www.wired.com/wired/, dated Sep. 5, 2003.
Internet Print Out: "Anoto functionality," News, dated Jul. 15, 2002.
Internet Print Out: "Anoto functionality," Showroom, dated Jul. 15, 2002.
Internet Print Out: "ChatPen CHA-30," Digital Pens, Anoto Functionality, dated Jul. 15, 2002.
Internet Print Out: "Cintiq18SX—A Powerful New Way To Work Directly On The Screen," Wacom Technology, Cintiq-Interactive Pen Display, dated Sep. 5, 2003.
Internet Print Out: "Communicate Digitally With Ordinary Pen and Paper," Anoto Functionality, dated Jul. 15, 2002.
Internet Print Out: "Creating A Global De Facto Standard," Anoto Functionality, dated Jul. 15, 2002.
Internet Print Out: "Daily News," dated Aug. 15, 2002.
Internet Print Out: "Digital Pens and Technical Data," Anoto Functionality, dated Jul. 15, 2002.
Internet Print Out: "Downloads," Anoto Functionality, dated Jul. 15, 2002.
Internet Print Out: "Optical Translation Measurement (OTM™)," Technologies, dated Jul. 15, 2002.
Internet Print Out: "Partners Supporting Anoto Functionality," Anoto Functionality, dated 15, 2002.
Internet Print Out: "Possibilities," Anoto Functionality, dated Jul. 15, 2002.
Internet Print Out: "Product VPen™," OTM Technologies, dated Jul. 15, 2002.
Internet Print Out: "Products—Get Everyone On The Same Page," Mimio, dated Sep. 5, 2003.
Internet Print Out: "Sensor Board and Pen," Wacom, Product, dated Jul. 15, 2002.
Internet Print Out: "The Solution," Anoto Functionality, dated Jul. 15, 2002.
Internet Print Out: "Vision and Mission," Anoto Functionality, dated Jul. 15, 2002.
Internet Print Out: "Wacom Displays Pressure-Sensitive Pen Sensor for Tablet PCs," Wacom, News, dated Jul. 15, 2002.
Internet Print Out: "Welcome To www.anoto.com," Anoto, dated Jul. 15, 2002.
Internet Printout—http://www.anoto.com: Construction, Sep. 5, 2003.
Internet Printout—http://www.anoto.com: Page template, Sep. 5, 2003.
Internet Printout—http://www.anoto.com: Paper and Printing, Sep. 5, 2003.
Internet Printout—http://www.anoto.com: Paper space, Sep. 5, 2003.
Internet Printout—http://www.anoto.com: Pattern, Sep. 5, 2003.
Internet Printout—http://www.anoto.com: Printers supporting Anoto functionality, Sep. 5, 2003.
Internet Printout—http://www.anotofunctionality.com: Anoto Functionality—Anoto pattern & digital paper, Sep. 26, 2002.
Internet Printout—http://www.anotofunctionality.com: Anoto Functionality—Anoto pattern & digital paper, Sep. 5, 2003.
Internet Printout—http://www.anotofunctionality.com: Anoto Functionality—Applications, Sep. 5, 2003.
Internet Printout—http://www.anotofunctionality.com: Anoto Functionality—Corporate applications, Sep. 5, 2003.
Internet Printout—http://www.anotofunctionality.com: Anoto Functionality—Digital notes, Sep. 5, 2003.
Internet Printout—http://www.anotofunctionality.com: Anoto Functionality—Digital paper, Sep. 26, 2002.
Internet Printout—http://www.anotofunctionality.com: Anoto Functionality—Digital paper, Sep. 5, 2003.
Internet Printout—http://www.anotofunctionality.com: Anoto Functionality—Digital pens Use with mobile phones, Sep. 5, 2003.
Internet Printout—http://www.anotofunctionality.com: Anoto Functionality—Digital Pens Use with personal computers, Sep. 26, 2002.
Internet Printout—http://www.anotofunctionality.com: Anoto Functionality—Digital Pens, Sep. 26, 2002.
Internet Printout—http://www.anotofunctionality.com: Anoto Functionality—Digital pens, Sep. 5, 2003.
Internet Printout—http://www.anotofunctionality.com: Anoto Functionality—Digital service, Sep. 26, 2002.
Internet Printout—http://www.anotofunctionality.com: Anoto Functionality—Digital service, Sep. 5, 2003.
Internet Printout—http://www.anotofunctionality.com: Anoto Functionality—E-mail, Sep. 5, 2003.
Internet Printout—http://www.anotofunctionality.com: Anoto Functionality—Fax, Sep. 5, 2003.
Internet Printout—http://www.anotofunctionality.com: Anoto Functionality—Freedom of expression, Sep. 26, 2002.
Internet Printout—http://www.anotofunctionality.com: Anoto Functionality—Graphical SMS, Sep. 5, 2003.
Internet Printout—http://www.anotofunctionality.com: Anoto Functionality—Hints & tips Using your digital paper, Sep. 5, 2003.
Internet Printout—http://www.anotofunctionality.com: Anoto Functionality—Hints & tips Using your digital pen, Sep. 5, 2003.
Internet Printout—http://www.anotofunctionality.com: Anoto Functionality—Hints & tips Using Your Digital Service, Sep. 5, 2003.
Internet Printout—http://www.anotofunctionality.com: Anoto Functionality—Hints & tips, Sep. 5, 2003.
Internet Printout—http://www.anotofunctionality.com: Anoto Functionality—How does it work?, Sep. 26, 2002.
Internet Printout—http://www.anotofunctionality.com: Anoto Functionality—Security, Sep. 5, 2003.
Internet Printout—http://www.anotofunctionality.com: Anoto Functionality—Software and Additionals, Sep. 5, 2003.
Internet Printout—http://www.anotofunctionality.com: Anoto Functionality—What is Anoto functionality?, Sep. 5, 2003.
Internet Printout—http://www.anotofunctionality.com: Anoto Functionality—You to an organization, Sep. 26, 2002.
Internet Printout—http://www.anotofunctionality.com: Anoto Functionality—You to someone else, Sep. 26, 2002.
Internet Printout—http://www.anotofunctionality.com: Anoto Functionality—You to yourself, Sep. 26, 2002.
Internet Printout—http://www.anotofunctionality.com: Anoto® functionality brings digital life to paper products, Sep. 5, 2003.
Internet Printout—http://www.edgereview.com: The Edge—First Look: Digital Ink n-scribe, Sep. 5, 2003.
Internet Printout—http://www.flashcommerce.com: n-scribe For Digital Writing, Sep. 5, 2003.
Internet Printout—http://www.gizmo.com: Maxell Digital Pen to use Anoto system, Sep. 5, 2003.
Internet Printout—http://www.is.cs.cmu.edu: Final input representation, Aug. 8, 2002.
Internet Printout—http://www.is.cs.cmu.edu: Npen++, Aug. 8, 2002.
Internet Printout—http://www.mimio.com: Capture, Save and Share, Sep. 5, 2003.
Internet Printout—http://www.mimio.com: Mimio technology, Sep. 5, 2003.
Internet Printout—http://www.mimio.com: Turn your whiteboard into an interactive whiteboard, Sep. 5, 2003.
Internet Printout—http://www.pcmag.com: Jot This, Sep. 5, 2003.
Internet Printout—http://www.smarttech.com: Carnegie Mellon research ranks the Smart Board™ interactive whiteboard as fastest, most accurate way to interact with projected information, Sep. 5, 2003.
Internet Printout—http://www.smarttech.com: Smart Board Interactive Whiteboard—Front Projection Features, Sep. 5, 2003.
Internet Printout—http://www.smarttech.com: Smart Board Interactive Whiteboard—Q&A, Sep. 5, 2003.
Internet Printout—http://www.smarttech.com: Smart Board Interactive Whiteboard, Sep. 5, 2003.
Internet Printout—http://www.smarttech.com: Smart Camfire™, whiteboard camera system effortlessly saves dry-erase whiteboard notes, Sep. 5, 2003.
Internet Printout—http://www.smarttech.com: Smart Technologies Inc. awarded another U.S. patent for touch sensitive Smart Board™ technology, Sep. 5, 2003.
Internet Printout—http://www.smarttech.com: Smart Technologies, Inc. Press Releases, Sep. 5, 2003.

Internet Printout—http://www.smarttech.com: Smart Technologies, Inc., New annotation and software functionality on all Smart Board™ Interactive Whiteboards, Sep. 5, 2003.

Internet Printout—http://www.smarttech.com: What's New, Sep. 5, 2003.

Internet Printout—http://www.smarttech.com: Press Releases—Smart launches Research Assistance Program, Sep. 5, 2003.

Internet Printout—http://www.smarttech.com: Smart Board Interactive Whiteboard Profiles—Sep. 5, 2003.

Internet Printout—http://www.smarttech.com: Smart Board Software Features—Sep. 5, 2003.

Internet Printout—http://www.tabletpccorner.com: Anoto Pen Bluetooth, Sep. 5, 2003.

Internet Printout—http://www.techtv.com: Nscribe Pen and Presenter-to-Go, Sep. 5, 2003.

Internet Printout—http://www.wacom.com: Cintiq—Interactive Pen Display, Sep. 5, 2003.

Internet Printout—http://www.wacom.com: Graphire2—Have more fun with digital phones, Sep. 5, 2003.

Internet Printout—http://www.wacom.com: Intuos2—The Professional Tablet, Sep. 5, 2003.

Internet Printout—http://www.wacom.com: intuos2, Sep. 5, 2003.

Internet Printout—http://www.wacom.com: Penabled Wacom, Sep. 5, 2003.

Internet Printout—http://www.wacom.com: tablet PC, Sep. 5, 2003.

Internet Printout—http://www.wired.com: The Hot New Medium: Paper, Sep. 5, 2003.

Jelinek, Frederic, "Statistical Methods for Speech Recognition," The MIT Press, pp. 1-283, 2001.

Ko et al., "Finger Mouse and Gesture Recognition System As A New Human Computer Interface," Computer and Graphics, Col. 21, No. 5, pp. 555-561, 1997.

Lau, R., "Adaptive Statistical Language Modeling," Submitted to the Dept. of Electrical Engineering and Computer Science in Partial Fulfillment for the Degree of Master of Science at the MIT, May 1994.

Lee, Kai-Fu, "Automatic Speech Recognition—The Development of the SPHINX System," Kluwer Academic Publishers, pp. 1-207, 1992.

Moran, et al., "Design and Technology for Collaborage: Collaborative Collages of Information on Physical Walls," Nov. 1999.

Munich, M.E.; Perona, P., "Visual Input for Pen-Based Computers," Image Processing, 1996, Proceedings International Conference on Sep. 16-19, 1996. vol. 1, pp. 173-176.

Nathan, K.S. et al., "On-Line Handwriting Recognition Using Continuous Parameter Hidden Markov Models," 1993 IEEE.

Okad, et al. "A Method for Document Digitizer by Real Time Assembling of Mosaic Pictures," Scripta Publishing Co., Systems, Computers, Controls, vol. 13, No. 5, Sep. 1982, pp. 74-80.

Okada et al., "A High-Resolution Handwriting Character Input Device Using Laser Beams," Department of Instrumentation Engineering, Faculty of Science and Technology, vol. 10.4, No. 11.1, 1981.

Otsu, Nubuyuki, "A Threshold Selection Method From Gray-Level Histogram," IEEE Transactions on Systems, Man, And Cybernetics; Jan. 1979, vol. SMC-9, No. 1, pp. 62-66.

Pursley, M. et al., "Numerical Evaluation of Correlation Parameters for Optimal Phrases of Binar Register Sequences," Communications, IEEE Transactions on Oct. 1979, vol. 27, Issue 10, Part 1, pp. 1597-1604.

Reynaerts, D. et al., "Design of an advanced computer writing tool," Micro Machine and Human Science, 1995, Proceedings of the Sixth International Symposium, Nagoya, Japan, Oct. 4-6, 1995, pp. 229-234.

Sato et al., "Novel device for Inputting Handwriting Trajectory," Ricoh Technical Report No. 27, Nov. 2001, pp. 52-59, http://www.ricoh.co.jp/rdc/techreport/No27/Ronbun/A2707.pdf.

Sato et al., "Video Tablet—2D Coordinate Input Device With OCD Camera," Osaka University, vol. J67-D, No. 6, Jun. 1984.

Shum, Heung-Yeung, et al., "Panoramic Image Mosaics," Microsoft Research Technical Report MSR-TR-97-23, 1997, 53 pages.

Tang, Xiaoou et al., "Video-based handwritten Chinese character recognition," Circuits and Systems for Video Technology, IEEE Transactions, Jan. 2005, vol. 15, Issue 1, pp. 167-174.

Urbanski, Brian, "Don't Break This Ink Pen," Edgereview.com, http://www.edgereview.com/ataglance.cfm?category=edge&ID=180, dated Jul. 15, 2002.

Urbanski, Brian, "Don't Break This Ink Pen," Edgereview.com, http://www.edgereview.com/ataglance.cfm?category=edge&ID=180, dated Sep. 5, 2003.

Louderback, Jim, "Nscribe pen And Presenter-To-Go—Infrared Pen And New Springboard Module Make Their Debut At Demo 2001," Edgereview.com, http://www.techtv.com/freshgear.pr, dated Sep. 5, 2003.

Van Liere, R. and Mulder, J.D., "Optical Tracking Using Projective Invariant Marker Pattern Properties," Virtual Reality, 2003. Proceedings, IEEE, Mar. 22-26, 2003, pp. 191-198.

\* cited by examiner

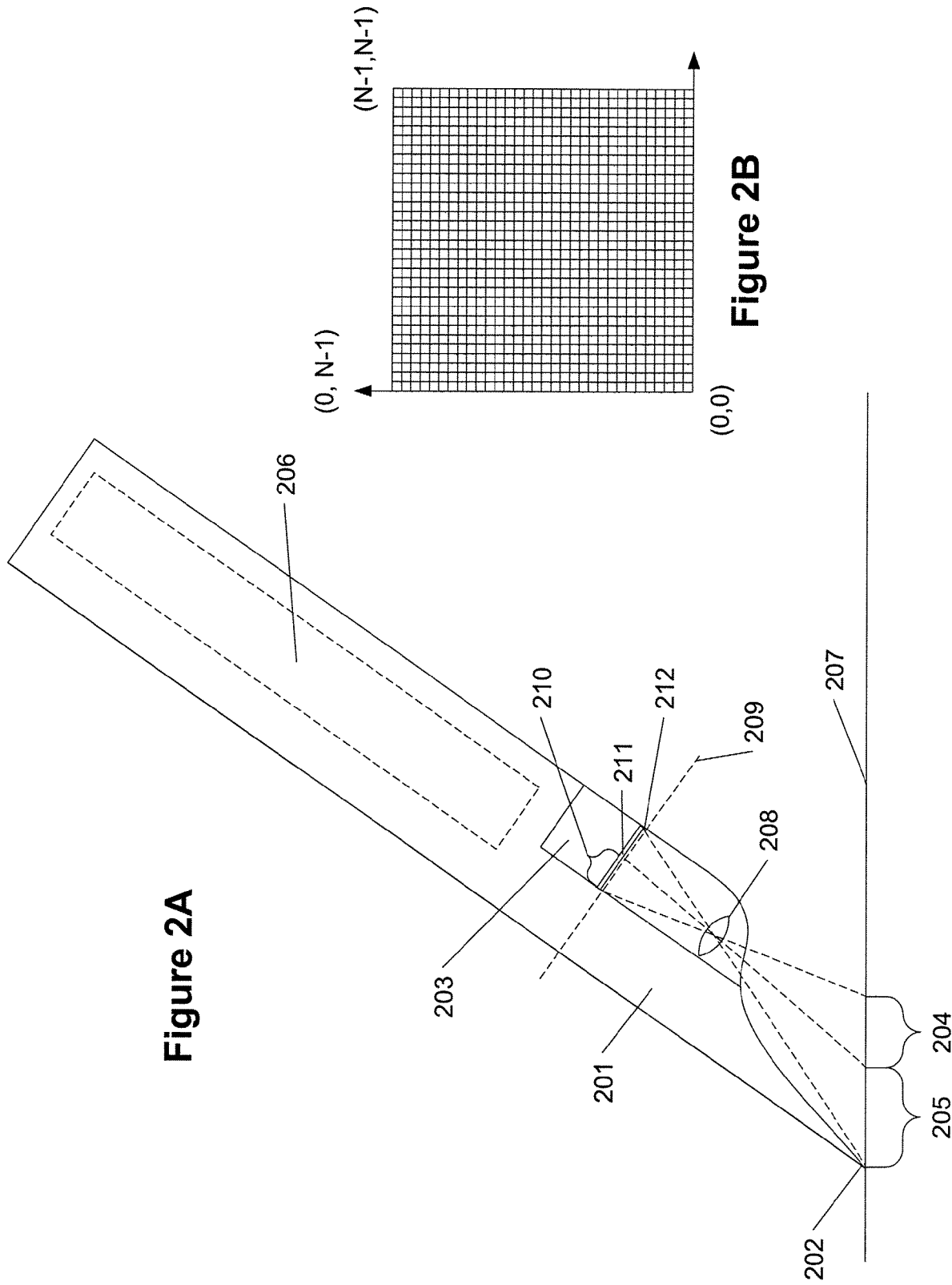

Figure 3A  0000010 00 01100 0101 001 111010 0 0111001 0 010110 111 0110 01101 01 0111111
Figure 3B  0000000 0011101 0100111 1110100 1000101 1110100 0100111 0011101
Figure 3C  0001001000 0011111110 0101111101 0100111101 0100011001 011100111 0010111010 011000011
Figure 3D
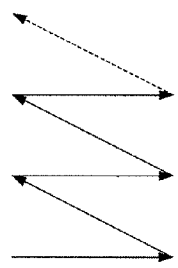
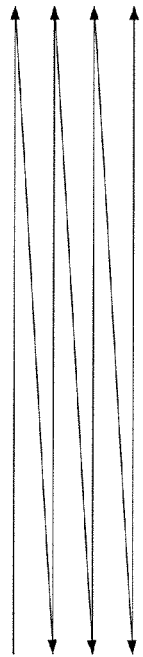
Figure 3E
Figure 3F

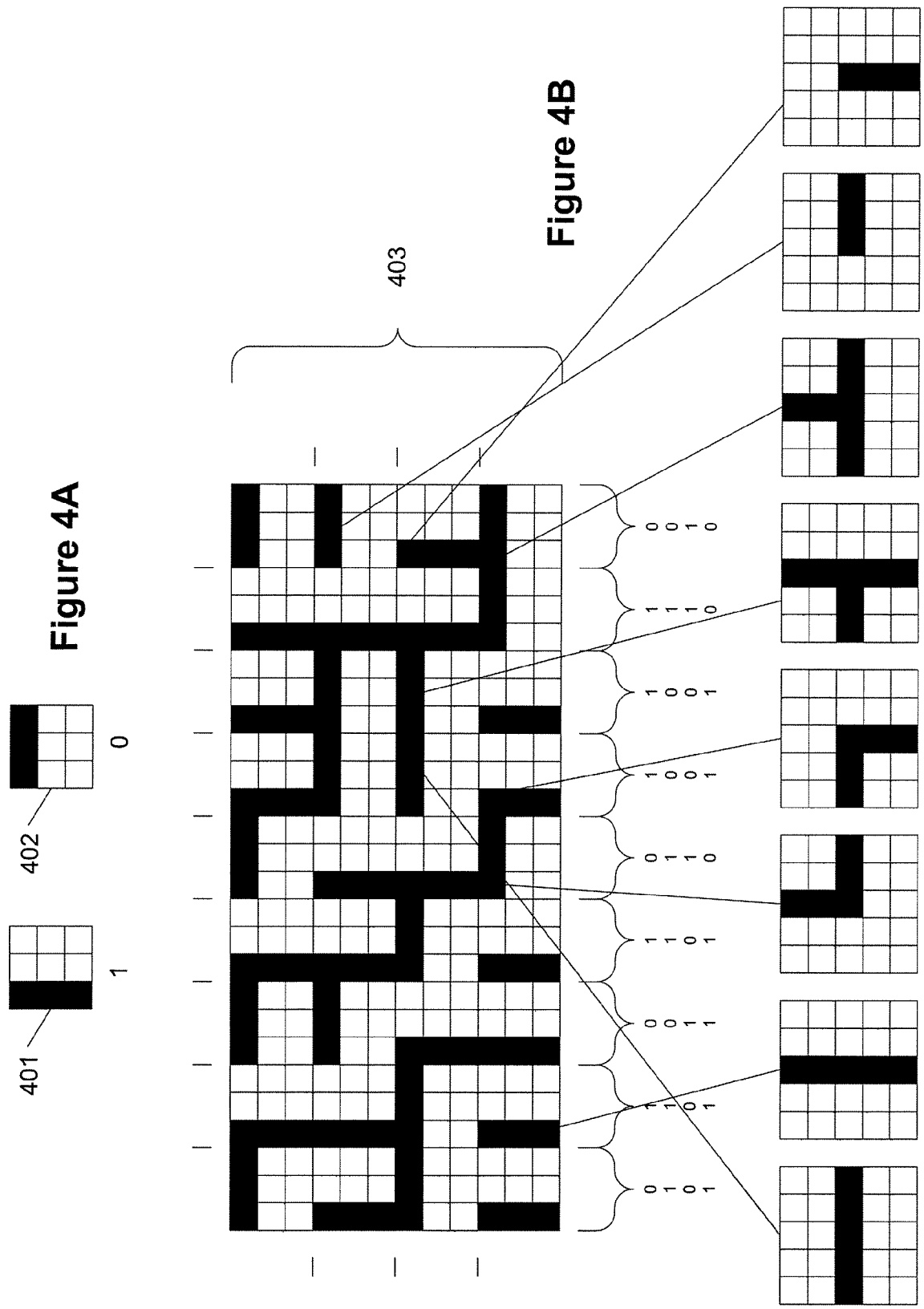

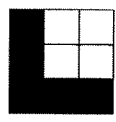
Figure 5A
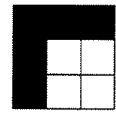
Figure 5B
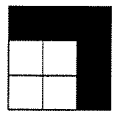
Figure 5C
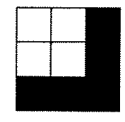
Figure 5D
Figure 4C
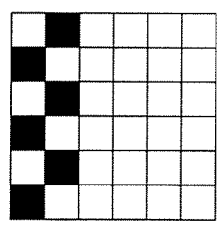
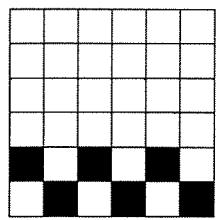
Figure 4D
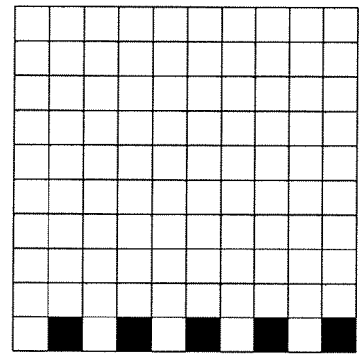
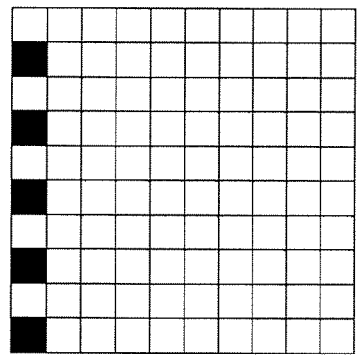
Figure 4E
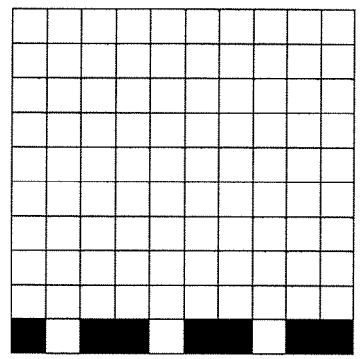
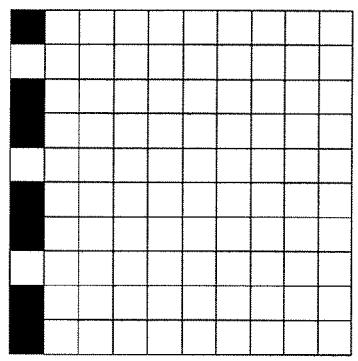

$$o = \theta + \begin{cases} 0 - no\ a \\ \dfrac{\pi}{2} - no\ b \\ \pi - no\ c \\ \dfrac{3\pi}{2} - no\ d \end{cases}$$

l also realize a truly
nd Pocket PCs into
osoft ink technology
:n computing resear

FIG. 24 l also realize a truly
nd Pocket PCs into
osoft ink technology
:n computing resear

FIG. 25

STROKES LOCALIZATION BY M-ARRAY DECODING AND FAST IMAGE MATCHING

This application is a continuation of common-owned, co-pending U.S. application Ser. No. 10/759,357 filed on Jan. 16, 2004, naming Jian Wang, Yingnong Dang, Qiang Wang, Liyong Chen and Xiaoxu Ma as inventors.

TECHNICAL FIELD

The present invention relates to interacting with a medium using a digital pen. More particularly, the present invention relates to determining the location of a digital pen during interaction with one or more surfaces.

BACKGROUND

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user. One of the difficulties, however, with having a printed document with annotations is the later need to have the annotations entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations is needed.

One technique of capturing handwritten information is by using a pen whose location may be determined during writing. One pen that provides this capability is the Anoto pen by Anoto Inc. This pen functions by using a camera to capture an image of paper encoded with a predefined pattern. An example of the image pattern is shown in FIG. 11. This pattern is used by the Anoto pen (by Anoto Inc.) to determine a location of a pen on a piece of paper. However, it is unclear how efficient the determination of the location is with the system used by the Anoto pen. To provide efficient determination of the location of the captured image, a system is needed that provides efficient decoding of the captured image.

When reviewing a document, a user may annotate the document by moving a pen tip with respect to the document. The path of the pen tip may comprise a plurality of strokes, where each stroke corresponds to a series of captured images. Hence, there is a real need in the industry to identify the path of the pen in order to process the annotation on a document.

SUMMARY

Aspects of the present invention provide system and methods that determine a path of a pen tip as the pen tip is moved across a document. With an aspect of the invention, the document is watermarked with a maze pattern from which encoded position information is determined.

With another aspect of the invention, a sequence of images is captured by a camera that is located in a pen. The path of the pen tip is determined by decoding the associated maze pattern (m-array) and by matching the captured images with document images.

With another aspect of the invention, if the position coordinates of any frame (corresponding to a captured image) that is associated with a stroke cannot be determined from m-array decoding, the frames are transformed and then matched with an area of a document image. Once the position coordinates of at least one frame are determined, the position coordinates of other frames may be determined by matching the frames in a neighboring area.

With another aspect of the invention, the path of the pen tip (corresponding to a stroke) is mapped from a frame center using a perspective transform and calibration parameters. The perspective transform is obtained from maze pattern analysis and by matching camera-captured images with document images.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 2A and 2B show an image capture system and corresponding captured image in accordance with embodiments of the present invention.

FIGS. 3A through 3F show various sequences and folding techniques in accordance with embodiments of the present invention.

FIGS. 4A through 4E show various encoding systems in accordance with embodiments of the present invention.

FIGS. 5A through 5D show four possible resultant corners associated with the encoding system according to FIGS. 4A and 4B.

FIG. 24 shows a recovered stroke of a pen tip and a path of corresponding centers of captured images in accordance with an embodiment of the invention.

FIG. 25 shows an actual stroke that corresponds to the recovered stroke as shown in FIG. 24.

DETAILED DESCRIPTION

Aspects of the present invention relate to determining the location of a captured image in relation to a larger image. The location determination method and system described herein may be used in combination with a multi-function pen.

The following is separated by subheadings for the benefit of the reader. The subheadings include: terms, general-purpose computer, image capturing pen, encoding of array, decoding, error correction, location determination, m-array decoding, and architecture for determining a path of a pen.

Terms

Pen—any writing implement that may or may not include the ability to store ink. In some examples, a stylus with no ink capability may be used as a pen in accordance with embodiments of the present invention.

Camera—an image capture system that may capture an image from paper or any other medium.

General Purpose Computer

Figure 1:
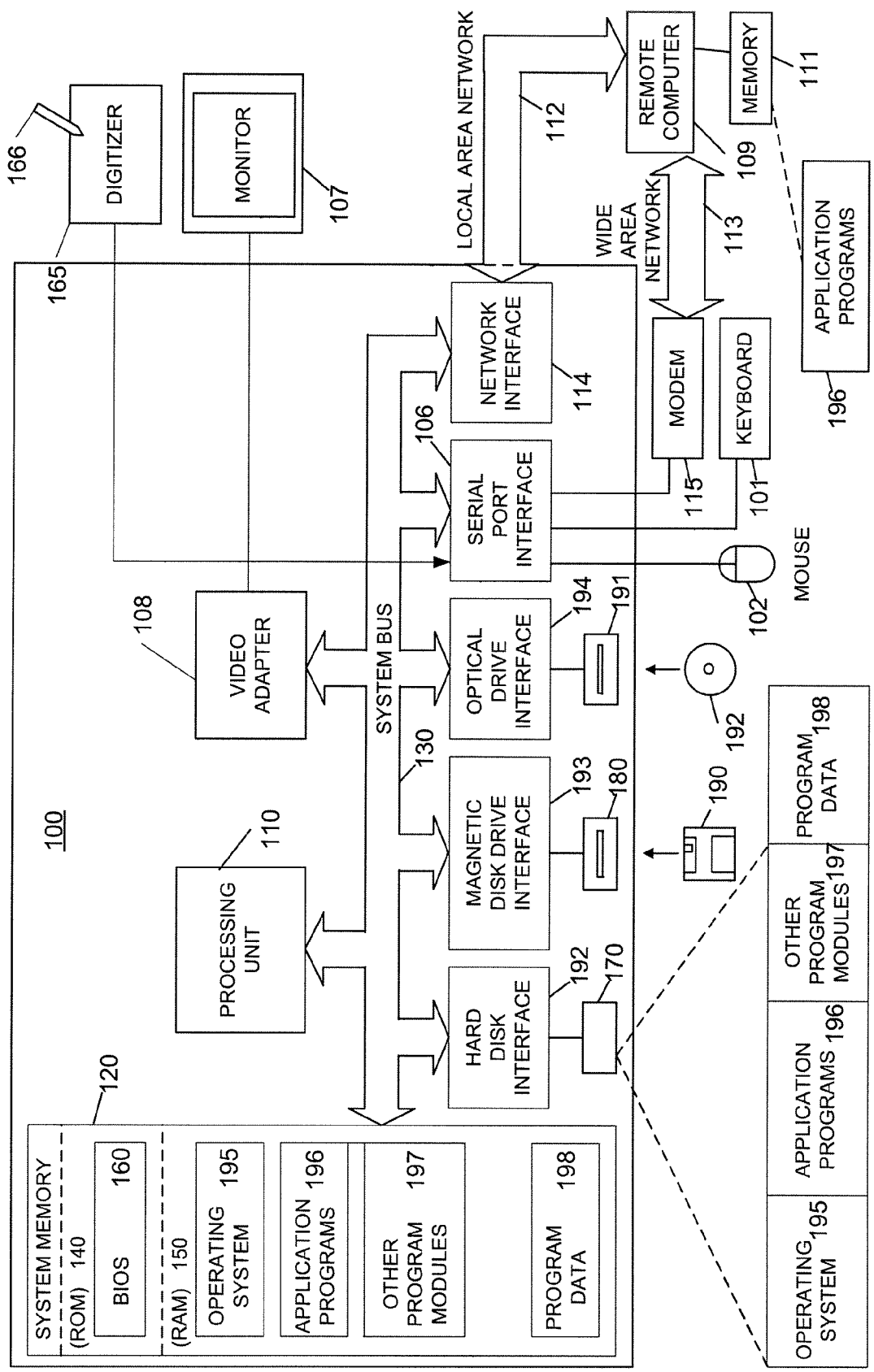
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form that represents the encoded data stream. (For example, as will be discussed with FIG. 4B, the encoded data stream is used to create a graphical pattern.) The displayed form may be printed paper (or other physical medium) or may be a display projecting the encoded data stream in conjunction with another image or set of images. For example, the encoded data stream may be represented as a physical graphical image on the paper or a graphical image overlying the displayed image (e.g., representing the text of a document) or may be a physical (non-modifiable) graphical image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing images with a camera in the pen or stylus as the pen or stylus traverses a document, the system can track movement of the stylus being controlled by the user. The displayed or printed image may be a watermark associated with the blank or content-rich paper or may be a watermark associated with a displayed image or a fixed coding overlying a screen or built into a screen.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 (i.e., the resolution of the image sensor of the camera) is 32×32 pixels (where N=32). In the embodiment, a captured image (32 pixels by 32 pixels) corresponds to an area of approximately 5 mm by 5 mm of the surface plane captured by camera 203. Accordingly, FIG. 2B shows a field of view of 32 pixels long by 32 pixels wide. The size of N is adjustable, such that a larger N corresponds to a higher image resolution. Also, while the field of view of the camera 203 is shown as a square for illustrative purposes here, the field of view may include other shapes as is known in the art.

The images captured by camera 203 may be defined as a sequence of image frames $\{I_i\}$, where $I_i$ is captured by the pen 201 at sampling time $t_i$. The sampling rate may be large or small, depending on system configuration and performance requirement. The size of the captured image frame may be large or small, depending on system configuration and performance requirement.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5 pixels, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211.

The following transformation $F_{S \rightarrow P}$ transforms position coordinates in the image captured by camera to position coordinates in the real image on the paper:

$$L_{paper} = F_{S \rightarrow P}(L_{Sensor})$$

During writing, the pen tip and the paper are on the same plane. Accordingly, the transformation from the virtual pen tip to the real pen tip is also $F_{S \rightarrow P}$:

$$L_{pentip} = F_{S \rightarrow P}(L_{virtual-pentip})$$

The transformation $F_{S \rightarrow P}$ may be estimated as an affine transform. This simplifies as:

$$F'_{S \rightarrow P} = \begin{Bmatrix} \dfrac{s_x \sin\theta_y}{\cos\theta_x \sin\theta_y - \cos\theta_y \sin\theta_x}, & -\dfrac{s_x \cos\theta_y}{\cos\theta_x \sin\theta_y - \cos\theta_y \sin\theta_x}, & 0 \\ -\dfrac{s_y \sin\theta_x}{\cos\theta_x \sin\theta_y - \cos\theta_y \sin\theta_x}, & \dfrac{s_y \cos\theta_x}{\cos\theta_x \sin\theta_y - \cos\theta_y \sin\theta_x}, & 0 \\ 0, & 0, & 1 \end{Bmatrix}$$

as the estimation of $F_{S \rightarrow P}$, in which $\theta_x$, $\theta_y$, $s_x$, and $s_y$ are the rotation and scale of two orientations of the pattern captured at location 204. Further, one can refine $F'_{S \rightarrow P}$ by matching the captured image with the corresponding real image on paper. "Refine" means to get a more precise estimation of the transformation $F_{S \rightarrow P}$ by a type of optimization algorithm referred to as a recursive method. The recursive method treats the matrix $F'_{S \rightarrow P}$ as the initial value. The refined estimation describes the transformation between S and P more precisely.

Next, one can determine the location of virtual pen tip by calibration.

One places the pen tip 202 on a fixed location $L_{pentip}$ on paper. Next, one tilts the pen, allowing the camera 203 to capture a series of images with different pen poses. For each image captured, one may obtain the transformation $F_{S \to P}$. From this transformation, one can obtain the location of the virtual pen tip $L_{virtual-pentip}$:

$$L_{virtual-pentip} = F_{P \to S}(L_{pentip})$$

where $L_{pentip}$ is initialized as (0, 0) and $$F_{P \to S} = (F_{S \to P})^{-1}$$

By averaging the $L_{virtual-pentip}$ obtained from each image, a location of the virtual pen tip $L_{virtual-pentip}$ may be determined. With $L_{virtual-pentip}$, one can get a more accurate estimation of $L_{pentip}$. After several times of iteration, an accurate location of virtual pen tip $L_{virtual-pentip}$ may be determined.

The location of the virtual pen tip $L_{virtual-pentip}$ is now known. One can also obtain the transformation $F_{S \to P}$ from the images captured. Finally, one can use this information to determine the location of the real pen tip $L_{pentip}$:

$$L_{pentip} = F_{S \to P}(L_{virtual-pentip})$$

Encoding of Array

A two-dimensional array may be constructed by folding a one-dimensional sequence. Any portion of the two-dimensional array containing a large enough number of bits may be used to determine its location in the complete two-dimensional array. However, it may be necessary to determine the location from a captured image or a few captured images. So as to minimize the possibility of a captured image portion being associated with two or more locations in the two-dimensional array, a non-repeating sequence may be used to create the array. One property of a created sequence is that the sequence does not repeat over a length (or window) n. The following describes the creation of the one-dimensional sequence then the folding of the sequence into an array.

Sequence Construction

A sequence of numbers may be used as the starting point of the encoding system. For example, a sequence (also referred to as an m-sequence) may be represented as a q-element set in field $F_q$. Here, $q=p^n$ where $n \geq 1$ and p is a prime number. The sequence or m-sequence may be generated by a variety of different techniques including, but not limited to, polynomial division. Using polynomial division, the sequence may be defined as follows:

$$\frac{R_l(x)}{P_n(x)}$$

where $P_n(x)$ is a primitive polynomial of degree n in field $F_q[x]$ (having $q^n$ elements). $R_l(x)$ is a nonzero polynomial of degree l (where l<n) in field $F_q[x]$. The sequence may be created using an iterative procedure with two steps: first, dividing the two polynomials (resulting in an element of field $F_q$) and, second, multiplying the remainder by x. The computation stops when the output begins to repeat. This process may be implemented using a linear feedback shift register as set forth in an article by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568). In this environment, a relationship is established between cyclical shifting of the sequence and polynomial $R_l(x)$: changing $R_l(x)$ only cyclically shifts the sequence and every cyclical shifting corresponds to a polynomial $R_l(x)$. One of the properties of the resulting sequence is that, the sequence has a period of $q^n-1$ and within a period, over a width (or length) n, any portion exists once and only once in the sequence. This is called the "window property". Period $q^n-1$ is also referred to as the length of the sequence and n as the order of the sequence.

The process described above is but one of a variety of processes that may be used to create a sequence with the window property.

Array Construction

The array (or m-array) that may be used to create the image (of which a portion may be captured by the camera) is an extension of the one-dimensional sequence or m-sequence. Let A be an array of period $(m_1, m_2)$, namely $A(k+m_1,l)=A(k,l+m_2)=A(k,l)$. When an $n_1 \times n_2$ window shifts through a period of A, all the nonzero $n_1 \times n_2$ matrices over $F_q$ appear once and only once. This property is also referred to as a "window property" in that each window is unique.

A binary array (or m-array) may be constructed by folding the sequence. One approach is to obtain a sequence then fold it to a size of $m_1 \times m_2$ where the length of the array is $L=m_1 \times m_2=2^n-1$. Alternatively, one may start with a predetermined size of the space that one wants to cover (for example, one sheet of paper, 30 sheets of paper or the size of a computer monitor), determine the area $(m_1 \times m_2)$, then use the size to let $L \geq m_1 \times m_2$, where $L=2^n-1$.

A variety of different folding techniques may be used. For example, FIGS. 3A through 3C show three different sequences. Each of these may be folded into the array shown as FIG. 3D. The three different folding methods are shown as the overlay in FIG. 3D and as the raster paths in FIGS. 3E and 3F. We adopt the folding method shown in FIG. 3D.

To create the folding method as shown in FIG. 3D, one creates a sequence $\{a_i\}$ of length L and order n. Next, an array $\{b_{kl}\}$ of size $m_1 \times m_2$, where $\gcd(m_1, m_2)=1$ and $L=m_1 \times m_2$, is created from the sequence $\{a_i\}$ by letting each bit of the array be calculated as shown by equation 1:

$$b_{kl}=a_i, \text{ where } k=i \bmod(m_1), l=i \bmod(m_2), i=0, \ldots, L-1. \quad (1)$$

This folding approach may be alternatively expressed as laying the sequence on the diagonal of the array, then continuing from the opposite edge when an edge is reached.

Figure 11:
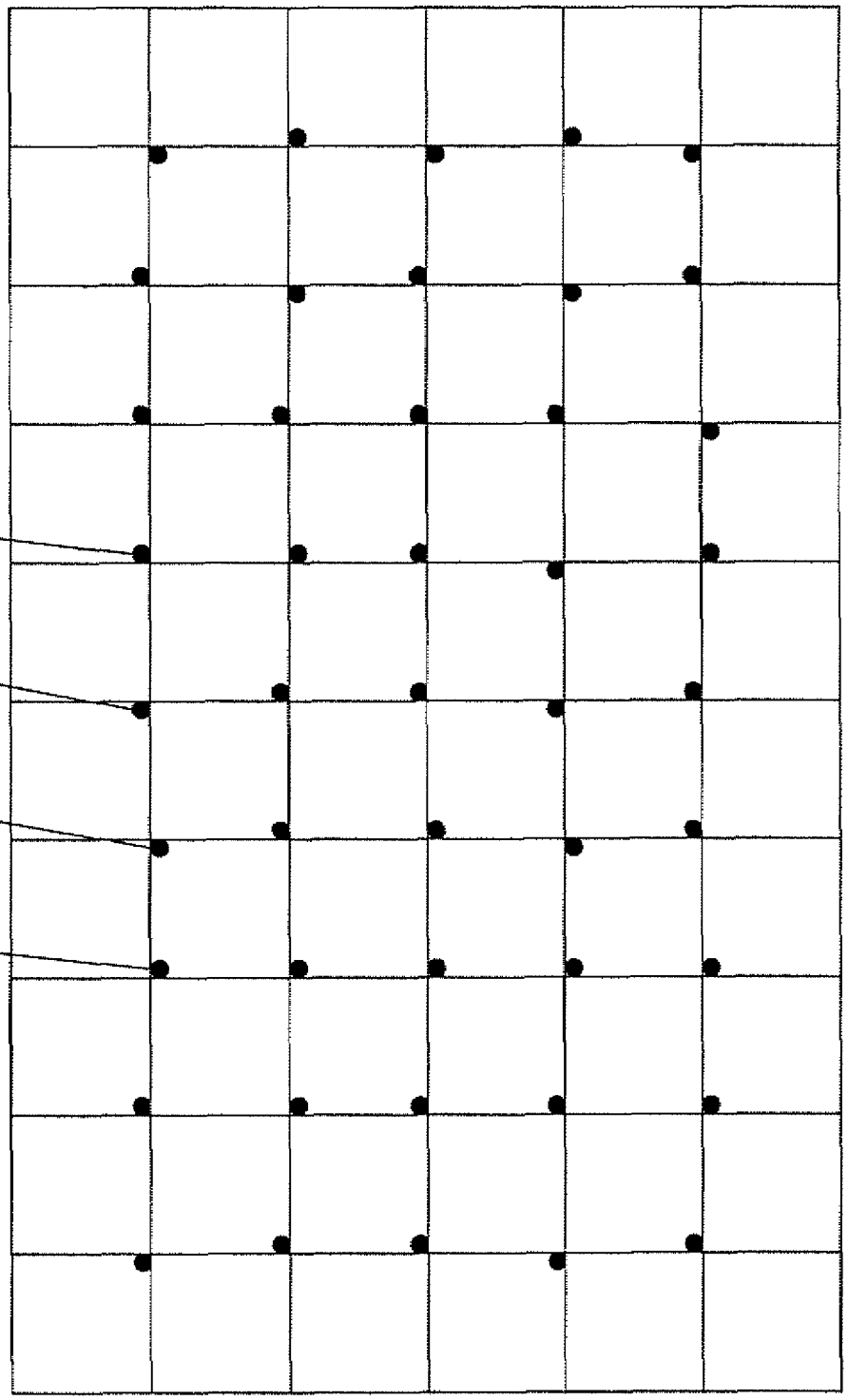
FIG. 11 shows a representation of encoding space in a document according to prior art.

FIG. 4A shows sample encoding techniques that may be used to encode the array of FIG. 3D. It is appreciated that other encoding techniques may be used. For example, an alternative coding technique is shown in FIG. 11.

Referring to FIG. 4A, a first bit 401 (for example, "1") is represented by a column of dark ink. A second bit 402 (for example, "0") is represented by a row of dark ink. It is appreciated that any color ink may be used to represent the various bits. The only requirement in the color of the ink chosen is that it provides a significant contrast with the background of the medium to be differentiable by an image capture system. The bits in FIG. 4A are represented by a 3×3 matrix of cells. The size of the matrix may be modified to be any size as based on the size and resolution of an image capture system. Alternative representation of bits 0 and 1 are shown in FIGS. 4C-4E. It is appreciated that the representation of a one or a zero for the sample encodings of FIGS. 4A-4E may be switched without effect. FIG. 4C shows bit representations occupying two rows or columns in an interleaved arrangement. FIG. 4D shows an alternative arrangement of the pixels in rows and columns in a dashed form. Finally FIG. 4E shows pixel representations in columns and rows in an irregular spacing format (e.g., two dark dots followed by a blank dot).

Referring back to FIG. 4A, if a bit is represented by a 3×3 matrix and an imaging system detects a dark row and two white rows in the 3×3 region, then a zero is detected (or one). If an image is detected with a dark column and two white columns, then a one is detected (or a zero).

Here, more than one pixel or dot is used to represent a bit. Using a single pixel (or bit) to represent a bit is fragile. Dust, creases in paper, non-planar surfaces, and the like create difficulties in reading single bit representations of data units. However, it is appreciated that different approaches may be used to graphically represent the array on a surface. Some approaches are shown in FIGS. 4C through 4E. It is appreciated that other approaches may be used as well. One approach is set forth in FIG. 11 using only space-shifted dots.

A bit stream is used to create the graphical pattern 403 of FIG. 4B. Graphical pattern 403 includes 12 rows and 18 columns. The rows and columns are formed by a bit stream that is converted into a graphical representation using bit representations 401 and 402. FIG. 4B may be viewed as having the following bit representation:

$$\begin{bmatrix} 0 & 1 & 0 & 1 & 0 & 1 & 1 & 1 & 0 \\ 1 & 1 & 0 & 1 & 1 & 0 & 0 & 1 & 0 \\ 0 & 0 & 1 & 0 & 1 & 0 & 0 & 1 & 1 \\ 1 & 0 & 1 & 1 & 0 & 1 & 1 & 0 & 0 \end{bmatrix}$$

Decoding

When a person writes with the pen of FIG. 2A or moves the pen close to the encoded pattern, the camera captures an image. For example, pen 201 may utilize a pressure sensor as pen 201 is pressed against paper and pen 201 traverses a document on the paper. The image is then processed to determine the orientation of the captured image with respect to the complete representation of the encoded image and extract the bits that make up the captured image.

For the determination of the orientation of the captured image relative to the whole encoded area, one may notice that not all the four conceivable corners shown in FIG. 5A-5D can present in the graphical pattern 403. In fact, with the correct orientation, the type of corner shown in FIG. 5A cannot exist in the graphical pattern 403. Therefore, the orientation in which the type of corner shown in FIG. 5A is missing is the right orientation.

Figures 6, 7:
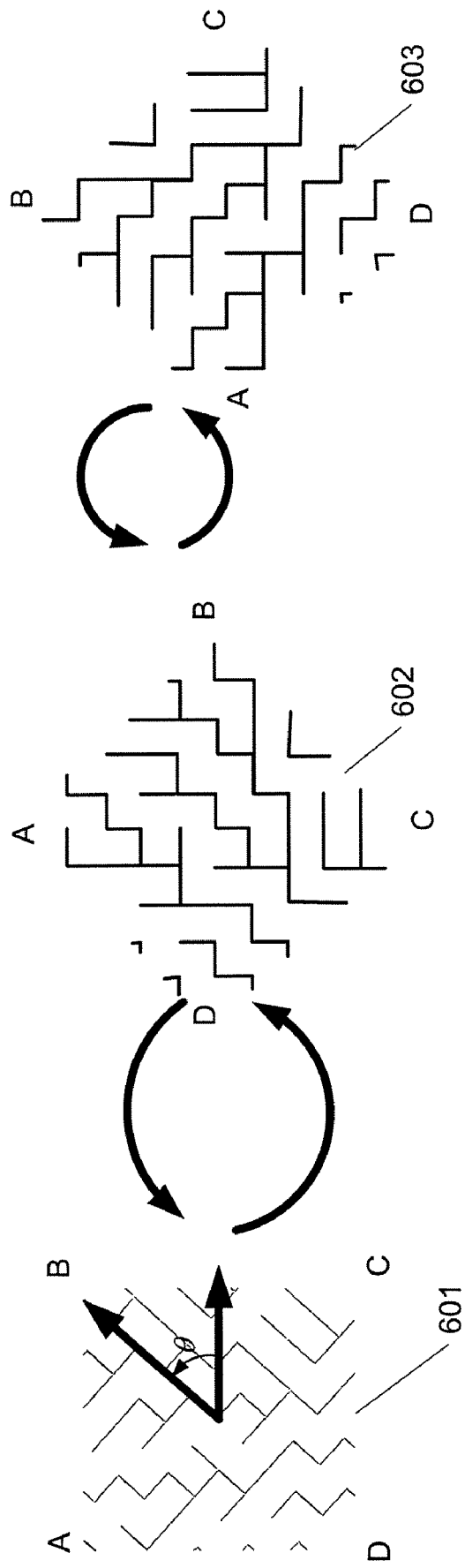
FIG. 6 shows rotation of a captured image portion in accordance with embodiments of the present invention.
FIG. 7 shows various angles of rotation used in conjunction with the coding system of FIGS. 4A through 4E.

Continuing to FIG. 6, the image captured by a camera 601 may be analyzed and its orientation determined so as to be interpretable as to the position actually represented by the image 601. First, image 601 is reviewed to determine the angle θ needed to rotate the image so that the pixels are horizontally and vertically aligned. It is noted that alternative grid alignments are possible including a rotation of the underlying grid to a non-horizontal and vertical arrangement (for example, 45 degrees). Using a non-horizontal and vertical arrangement may provide the probable benefit of eliminating visual distractions from the user, as users may tend to notice horizontal and vertical patterns before others. For purposes of simplicity, the orientation of the grid (horizontal and vertical and any other rotation of the underlying grid) is referred to collectively as the predefined grid orientation.

Next, image 601 is analyzed to determine which corner is missing. The rotation amount o needed to rotate image 601 to an image ready for decoding 603 is shown as o=(θ plus a rotation amount {defined by which corner missing}). The rotation amount is shown by the equation in FIG. 7. Referring back to FIG. 6, angle θ is first determined by the layout of the pixels to arrive at a horizontal and vertical (or other predefined grid orientation) arrangement of the pixels and the image is rotated as shown in 602. An analysis is then conducted to determine the missing corner and the image 602 rotated to the image 603 to set up the image for decoding. Here, the image is rotated 90 degrees counterclockwise so that image 603 has the correct orientation and can be used for decoding.

It is appreciated that the rotation angle θ may be applied before or after rotation of the image 601 to account for the missing corner. It is also appreciated that by considering noise in the captured image, all four types of corners may be present. We may count the number of corners of each type and choose the type that has the least number as the corner type that is missing.

Finally, the code in image 603 is read out and correlated with the original bit stream used to create image 403. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a Hamming distance between the two bit streams. It is appreciated that a variety of approaches may be used to determine the location of the recovered bit stream within the original bit stream.

Once one has the recovered bits, one needs to locate the captured image within the original array (for example, the one shown in FIG. 4B). The process of determining the location of a segment of bits within the entire array is complicated by a number of items. First, the actual bits to be captured may be obscured (for example, the camera may capture an image with document content that obscures the code). Second, dust, creases, reflections, and the like may also create errors in the captured image. These errors make the localization process more difficult. In this regard, the image capture system may need to function with non-sequential bits extracted from the image. The following represents a method for operating with non-sequential bits from the image.

Let the sequence (or m-sequence) I correspond to the power series $I(x)=1/P_n(x)$, where n is the order of the m-sequence, and the captured image contains K bits of I $b=(b_0\ b_1\ b_2\ \ldots\ b_{K-1})^t$, where $K \geq n$ and the superscript t represents a transpose of the matrix or vector. The location s of the K bits is just the number of cyclic shifts of I so that $b_0$ is shifted to the beginning of the sequence. Then this shifted sequence R corresponds to the power series $x^s/P_n(x)$, or $R=T^s(I)$, where T is the cyclic shift operator. We find this s indirectly. The polynomials modulo $P_n(x)$ form a field. It is guaranteed that $x^s \equiv r_0+r_1x+\ldots r_{n-1}x^{n-1} \bmod(P_n(x))$. Therefore, we may find $(r_0, r_1, \ldots, r_{n-1})$ and then solve for s.

The relationship $x^s \equiv r_0+r_1x+\ldots r_{n-1}x^{n-1} \bmod(P_n(x))$ implies that $R=r_0+r_1T(I)+\ldots+r_{n-1}T^{n-1}(I)$. Written in a binary linear equation, it becomes:

$$R=r^tA \qquad (2)$$

where $r=(r_0\ r_1\ r_2\ \ldots\ r_{n-1})^t$, and $A=(I\ T(I)\ \ldots\ T^{n-1}(I))^t$ which consists of the cyclic shifts of I from 0-shift to (n−1)-shift. Now only sparse K bits are available in R to solve r. Let the index differences between $b_i$ and $b_0$ in R be $k_i$, i=1,2,...,k−1, then the $1^{st}$ and $(k_i+1)$-th elements of R, i=1,2,...,k−1, are exactly $b_0, b_1, \ldots, b_{k-1}$. By selecting the $1^{st}$ and $(k_i+1)$-th columns of A, $i=1,2,\ldots,k-1$, the following binary linear equation is formed:

$$b'^t = r^t M \quad (3)$$

where M is an n×K sub-matrix of A.

If b is error-free, the solution of r may be expressed as:

$$r^t = \tilde{b}^t \tilde{M}^{-1} \quad (4)$$

where $\tilde{M}$ is any non-degenerate n×n sub-matrix of M and $\tilde{b}$ is the corresponding sub-vector of b.

With known r, we may use the Pohlig-Hellman-Silver algorithm as noted by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568) to find s so that $x^s \equiv r_0 + r_1 x + \ldots r_{n-1} x^{n-1} \mod(P_n(x))$.

As matrix A (with the size of n by L, where $L=2^n-1$) may be huge, we should avoid storing the entire matrix A. In fact, as we have seen in the above process, given extracted bits with index difference $k_i$, only the first and $(k_i+1)$-th columns of A are relevant to the computation. Such choices of $k_i$ is quite limited, given the size of the captured image. Thus, only those columns that may be involved in computation need to be saved. The total number of such columns is much smaller than L (where $L=2^n-1$ is the length of the m-sequence).

Error Correction

If errors exist in b, then the solution of r becomes more complex. Traditional methods of decoding with error correction may not readily apply, because the matrix M associated with the captured bits may change from one captured image to another.

We adopt a stochastic approach. Assuming that the number of error bits in b, $n_e$, is relatively small compared to K, then the probability of choosing the correct n bits from the K bits of b and the corresponding sub-matrix $\tilde{M}$ of M being non-degenerate is high.

When the n bits chosen are all correct, the Hamming distance between $b^t$ and $r^t M$, or the number of error bits associated with r, should be minimal, where r is computed via equation (4). Repeating the process for several times, it is likely that the correct r that results in the minimal error bits can be identified.

If there is only one r that is associated with the minimum number of error bits, then it is regarded as the correct solution. Otherwise, if there is more than one r that is associated with the minimum number of error bits, the probability that $n_e$ exceeds the error correcting ability of the code generated by M is high and the decoding process fails. The system then may move on to process the next captured image. In another implementation, information about previous locations of the pen can be taken into consideration. That is, for each captured image, a destination area where the pen may be expected next can be identified. For example, if the user has not lifted the pen between two image captures by the camera, the location of the pen as determined by the second image capture should not be too far away from the first location. Each r that is associated with the minimum number of error bits can then be checked to see if the location s computed from r satisfies the local constraint, i.e., whether the location is within the destination area specified.

If the location s satisfies the local constraint, the X, Y positions of the extracted bits in the array are returned. If not, the decoding process fails.

Figure 8:
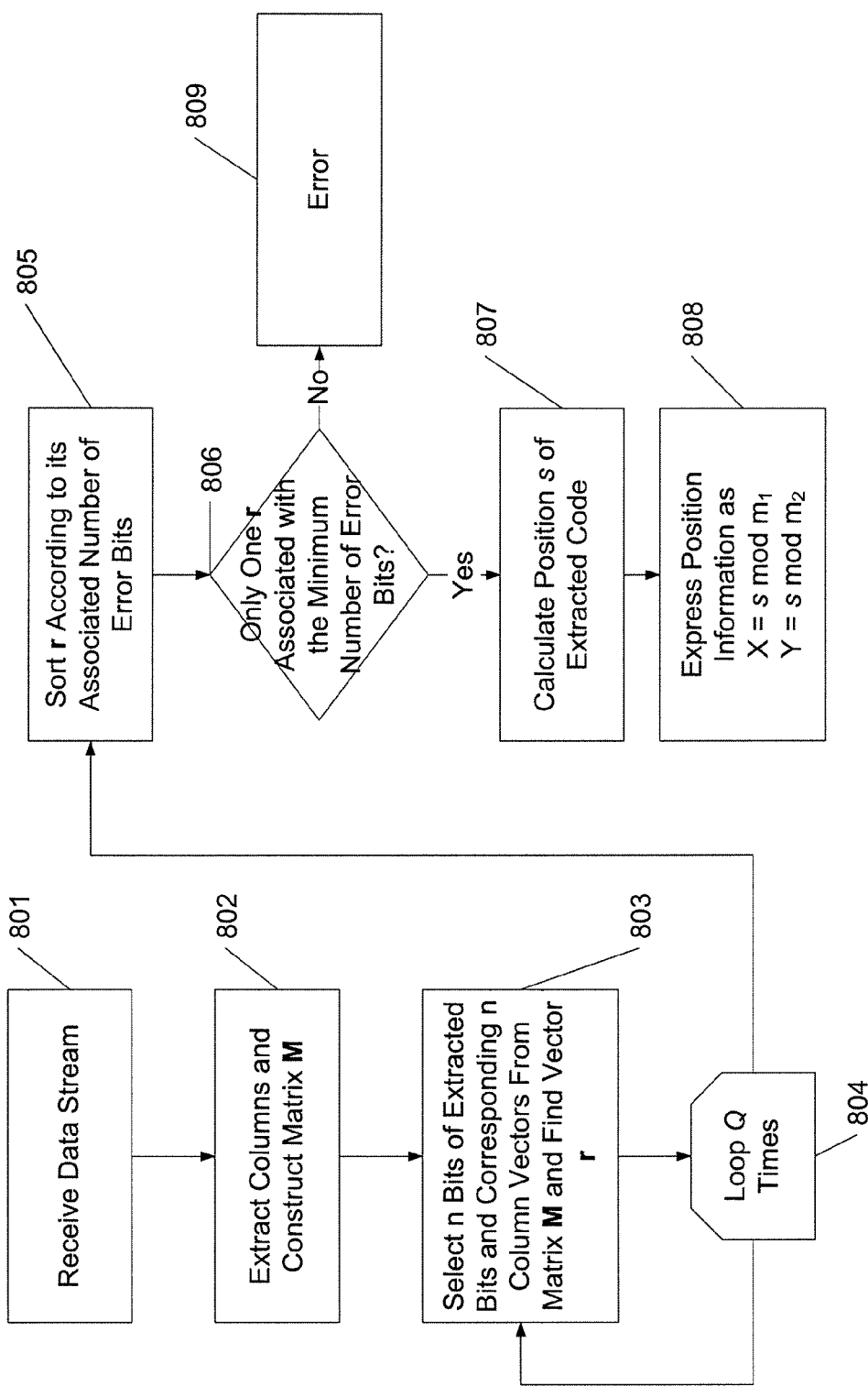
FIG. 8 shows a process for determining the location of a captured array in accordance with embodiments of the present invention.

FIG. 8 depicts a process that may be used to determine a location in a sequence (or m-sequence) of a captured image.

First, in step 801, a data stream relating to a captured image is received. In step 802, corresponding columns are extracted from A and a matrix M is constructed.

In step 803, n independent column vectors are randomly selected from the matrix M and vector r is determined by solving equation (4). This process is performed Q times (for example, 100 times) in step 804. The determination of the number of loop times is discussed in the section Loop Times Calculation later.

In step 805, r is sorted according to its associated number of error bits. The sorting can be done using a variety of sorting algorithms as known in the art. For example, a selection sorting algorithm may be used. The selection sorting algorithm is beneficial when the number Q is not large. However, if Q becomes large, other sorting algorithms (for example, a merge sort) that handle larger numbers of items more efficiently may be used.

The system then determines in step 806 whether error correction was performed successfully, by checking whether multiple r's are associated with the minimum number of error bits. If yes, an error is returned in step 809, indicating the decoding process failed. If not, the position s of the extracted bits in the sequence (or m-sequence) is calculated in step 807, for example, by using the Pohlig-Hellman-Silver algorithm.

Next, the (X,Y) position in the array is calculated as: $x=s \mod m_1$ and $y=s \mod m_2$ and the results are returned in step 808.

Location Determination

Figure 9:
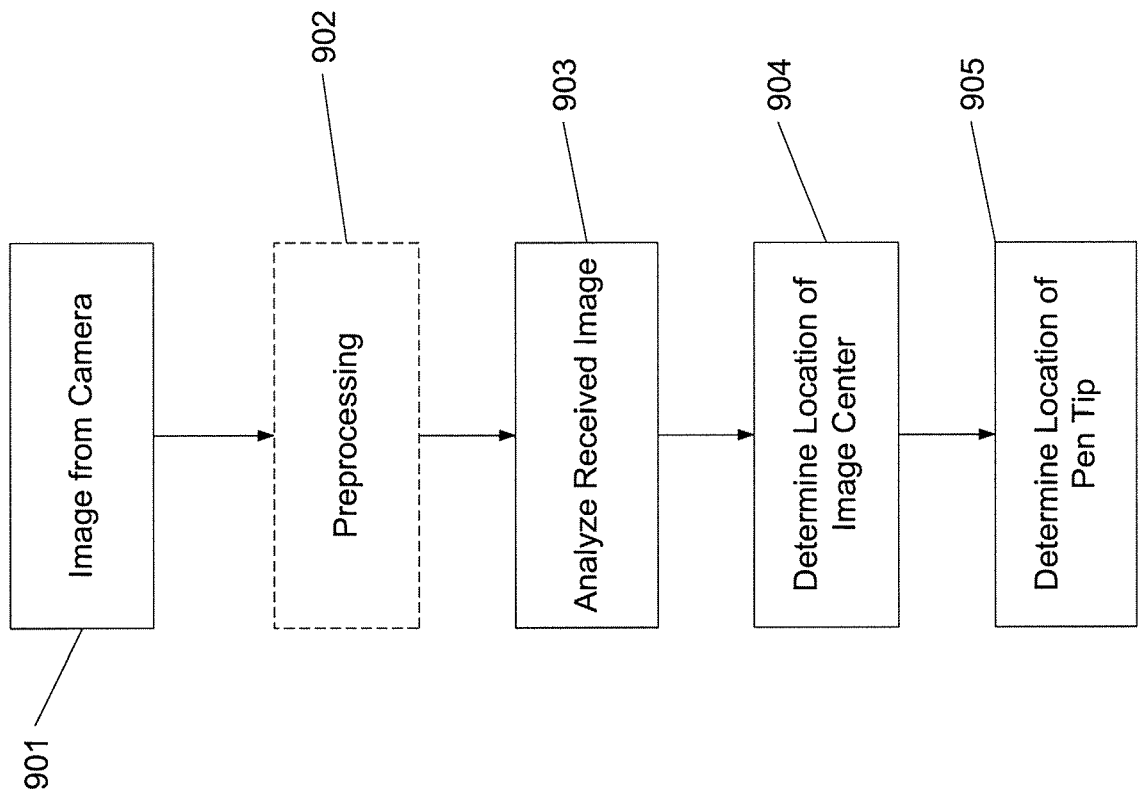
FIG. 9 shows a method for determining the location of a captured image in accordance with embodiments of the present invention.

FIG. 9 shows a process for determining the location of a pen tip. The input is an image captured by a camera and the output may be a position coordinates of the pen tip. Also, the output may include (or not) other information such as a rotation angle of the captured image.

In step 901, an image is received from a camera. Next, the received image may be optionally preprocessed in step 902 (as shown by the broken outline of step 902) to adjust the contrast between the light and dark pixels and the like.

Next, in step 903, the image is analyzed to determine the bit stream within it.

Next, in step 904, n bits are randomly selected from the bit stream for multiple times and the location of the received bit stream within the original sequence (or m-sequence) is determined.

Finally, once the location of the captured image is determined in step 904, the location of the pen tip may be determined in step 905.

Figure 10:
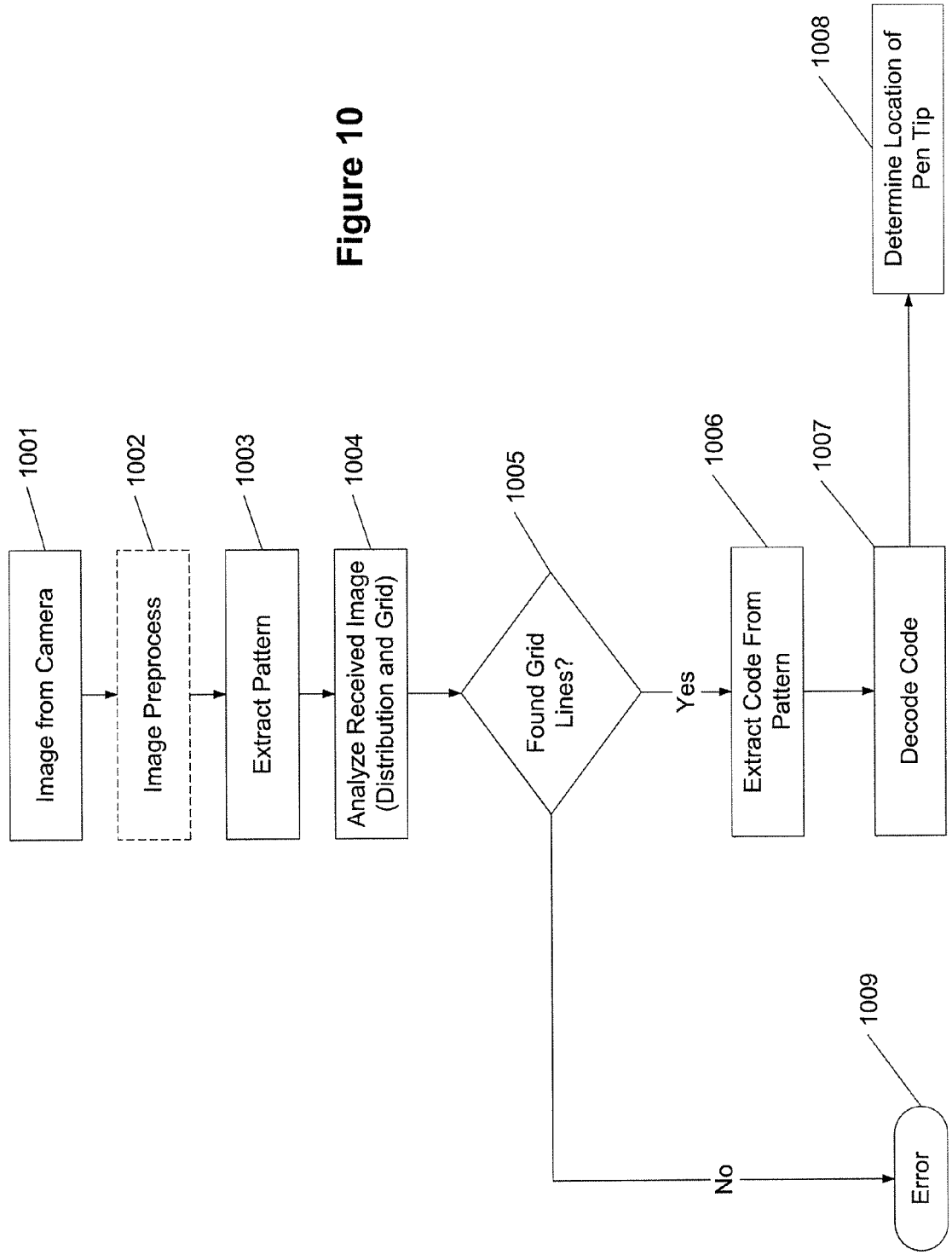
FIG. 10 shows another method for determining the location of a captured image in accordance with embodiments of the present invention.

FIG. 10 gives more details about 903 and 904 and shows the approach to extract the bit stream within a captured image. First, an image is received from the camera in step 1001. The image then may optionally undergo image preprocessing in step 1002 (as shown by the broken outline of step 1002). The pattern is extracted in step 1003. Here, pixels on the various lines may be identified and the orientation of the pattern (corresponding to the angle θ) passing through the pixel can be estimated.

Next, the received image is analyzed in step 1004 to determine the underlying grid lines. If grid lines are found in step 1005, then the code is extracted from the pattern in step 1006. The code is then decoded in step 1007 and the location of the pen tip is determined in step 1008. If no grid lines were found in step 1005, then an error is returned in step 1009.

Outline of Enhanced Decoding and Error Correction Algorithm

Figure 12:
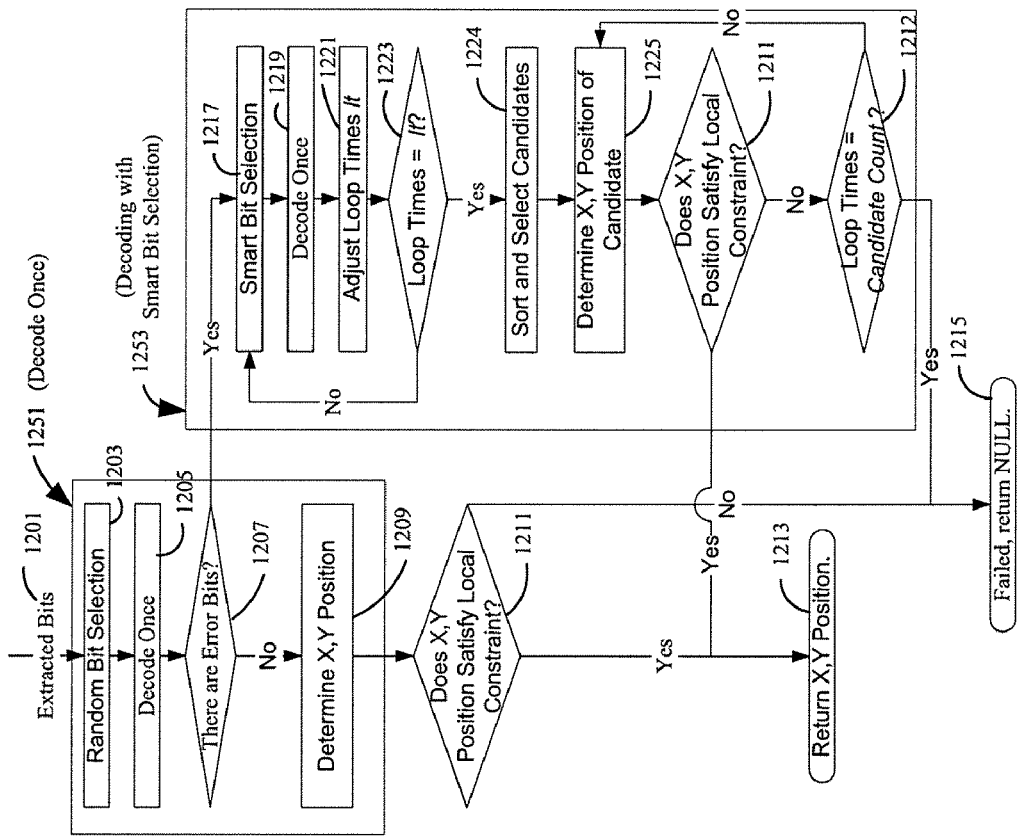
FIG. 12 shows a flow diagram for decoding extracted bits from a captured image in accordance with embodiments of the present invention.

With an embodiment of the invention as shown in FIG. 12, given extracted bits 1201 from a captured image (corresponding to a captured array) and the destination area, a variation of an m-array decoding and error correction process decodes the X,Y position. FIG. 12 shows a flow diagram of process 1200 of this enhanced approach. Process 1200 comprises two components 1251 and 1253.

Decode Once. Component 1251 includes three parts.
  random bit selection: randomly selects a subset of the extracted bits 1201 (step 1203)
  decode the subset (step 1205)
  determine X,Y position with local constraint (step 1209)
Decoding with Smart Bit Selection. Component 1253 includes four parts.
  smart bit selection: selects another subset of the extracted bits (step 1217)
  decode the subset (step 1219)
  adjust the number of iterations (loop times) of step 1217 and step 1219 (step 1221)
  determine X,Y position with local constraint (step 1225)

The embodiment of the invention utilizes a discreet strategy to select bits, adjusts the number of loop iterations, and determines the X,Y position (location coordinates) in accordance with a local constraint, which is provided to process 1200. With both components 1251 and 1253, steps 1205 and 1219 ("Decode Once") utilize equation (4) to compute r.

Let $\hat{b}$ be decoded bits, that is:

$$\hat{b}^t = r^t M \qquad (5)$$

The difference between b and $\hat{b}$ are the error bits associated with r.

FIG. 12 shows a flow diagram of process 1200 for decoding extracted bits 1201 from a captured image in accordance with embodiments of the present invention. Process 1200 comprises components 1251 and 1253. Component 1251 obtains extracted bits 1201 (comprising K bits) associated with a captured image (corresponding to a captured array). In step 1203, n bits (where n is the order of the m-array) are randomly selected from extracted bits 1201. In step 1205, process 1200 decodes once and calculates r. In step 1207, process 1200 determines if error bits are detected for b. If step 1207 determines that there are no error bits, X,Y coordinates of the position of the captured array are determined in step 1209. With step 1211, if the X,Y coordinates satisfy the local constraint, i.e., coordinates that are within the destination area, process 1200 provides the X,Y position (such as to another process or user interface) in step 1213. Otherwise, step 1215 provides a failure indication.

If step 1207 detects error bits in b, component 1253 is executed in order to decode with error bits. Step 1217 selects another set of n bits (which differ by at least one bit from the n bits selected in step 1203) from extracted bits 1201. Steps 1221 and 1223 determine the number of iterations (loop times) that are necessary for decoding the extracted bits. Step 1225 determines the position of the captured array by testing which candidates obtained in step 1219 satisfy the local constraint. Steps 1217-1225 will be discussed in more details.

Smart Bit Selection

Step 1203 randomly selects n bits from extracted bits 1201 (having K bits), and solves for $r_1$. Using equation (5), decoded bits can be calculated. Let $I_1 = \{k \in \{1,2, \ldots, K\} | b_k = \hat{b}hd\ k\}$, $\bar{I}_1 = \{k \in \{1,2, \ldots, K\} | b_k \neq \hat{b}_k\}$, where $\hat{b}_k$ is the $k^{th}$ bit of $\hat{b}$, $B_1 = \{b_k | k \in I_1\}$ and $\bar{B}_1 = \{b_k | k \in \bar{I}_1\}$, that is, $B_1$ are bits that the decoded results are the same as the original bits, and $\bar{B}_1$ are bits that the decoded results are different from the original bits, $I_1$ and $\bar{I}_1$ are the corresponding indices of these bits. It is appreciated that the same $r_1$ will be obtained when any n bits are selected from $B_1$. Therefore, if the next n bits are not carefully chosen, it is possible that the selected bits are a subset of $B_1$, thus resulting in the same $r_1$ being obtained.

Figure 13:
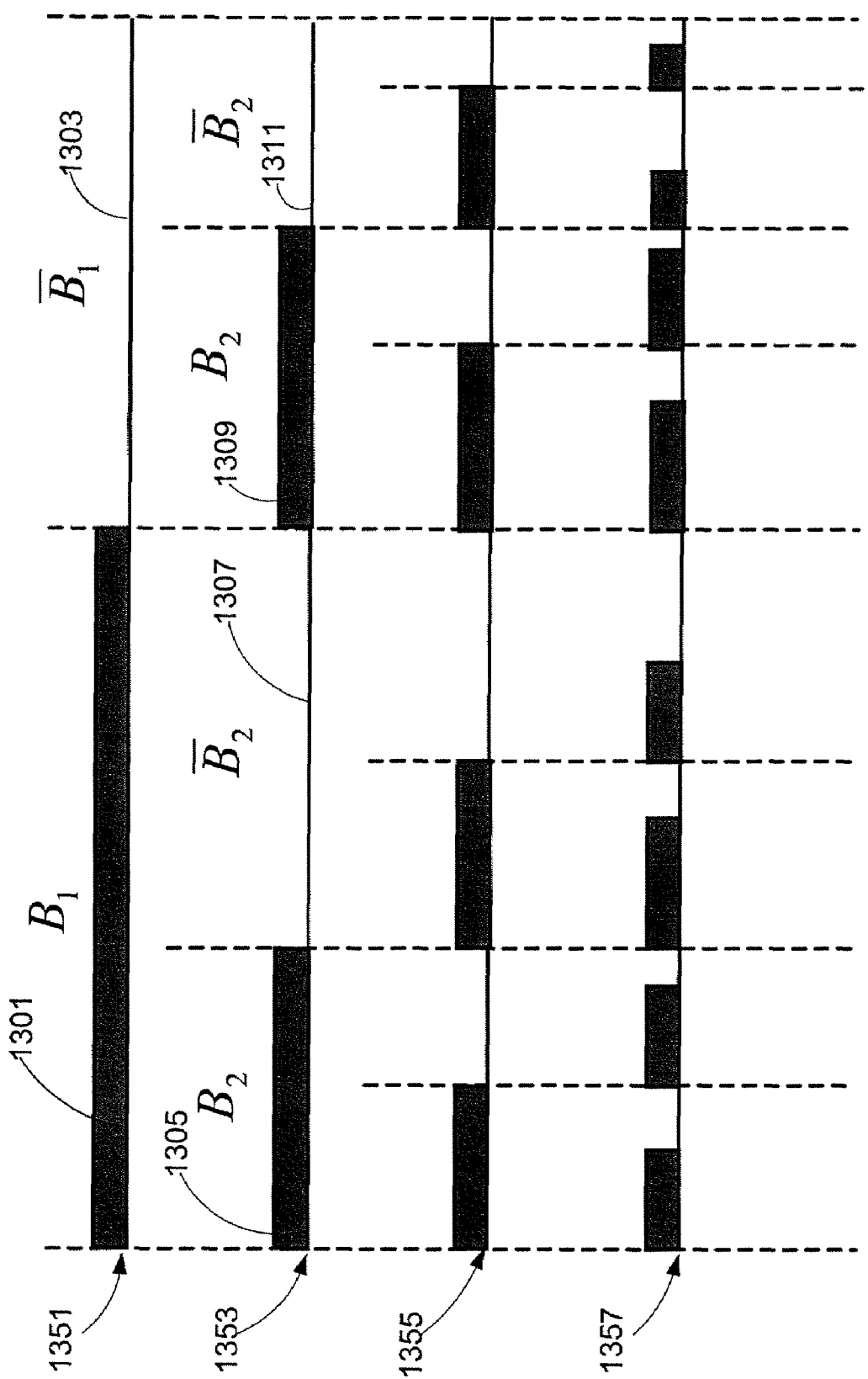
FIG. 13 shows bit selection of extracted bits from a captured image in accordance with embodiments of the present invention.
Figure 14:
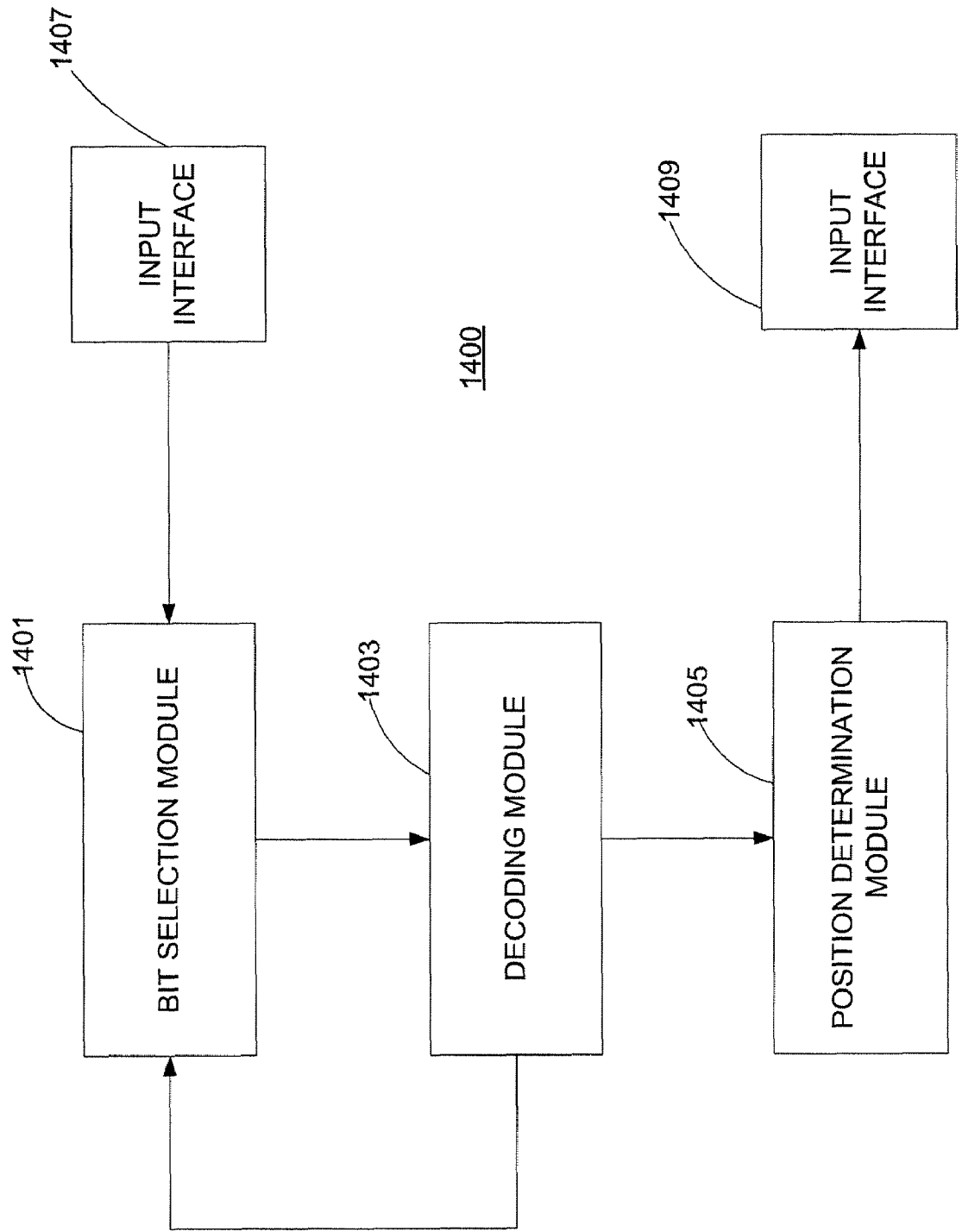
FIG. 14 shows an apparatus for decoding extracted bits from a captured image in accordance with embodiments of the present invention.

In order to avoid such a situation, step 1217 selects the next n bits according to the following procedure:

1. Choose at least one bit from $\bar{B}_1$ 1303 and the rest of the bits randomly from $B_1$ 1301 and $\bar{B}_1$ 1303, as shown in FIG. 13 corresponding to bit arrangement 1351. Process 1200 then solves $r_2$ and finds $B_2$ 1305, 1309 and $\bar{B}_2$ 1307, 1311 by computing $\hat{b}_2{}^t = r_2{}^t M_2$.
2. Repeat step 1. When selecting the next n bits, for every $\bar{B}_i$ (i=1, 2, 3 . . . , x−1, where x is the current loop number), there is at least one bit selected from $\bar{B}_i$. The iteration terminates when no such subset of bits can be selected or when the loop times are reached.

Loop Times Calculation

With the error correction component 1253, the number of required iterations (loop times) is adjusted after each loop. The loop times is determined by the expected error rate. The expected error rate $p_e$ in which not all the selected n bits are correct is:

$$p_e \left(1 - \frac{C_{K-n_e}^n}{C_K^n}\right)^{lt} \approx -e^{-lt\left(\frac{K-n}{K}\right)^{n_e}} \qquad (6)$$

where lt represents the loop times and is initialized by a constant, K is the number of extracted bits from the captured array, $n_e$ represents the minimum number of error bits incurred during the iteration of process 1200, n is the order of the m-array, and $C_K^n$ is the number of combinations in which n bits are selected from K bits.

In the embodiment, we want $p_e$ to be less than $e^{-5} = 0.0067$. In combination with (6), we have:

$$lt_i = \min\left(lt_{i-1}, \frac{5}{\left(\frac{K-n}{K}\right)^{n_e}} + 1\right) \qquad (7)$$

Adjusting the loop times may significantly reduce the number of iterations of process 1253 that are required for error correction.

Determine X, Y Position with Local Constraint

In steps 1209 and 1225, the decoded position should be within the destination area. The destination area is an input to the algorithm, and it may be of various sizes and places or simply the whole m-array depending on different applications. Usually it can be predicted by the application. For example, if the previous position is determined, considering the writing speed, the destination area of the current pen tip should be close to the previous position. However, if the pen is lifted, then its next position can be anywhere. Therefore, in this case, the destination area should be the whole m-array. The correct X,Y position is determined by the following steps.

In step 1224 process 1200 selects $r_i$ whose corresponding number of error bits is less than:

$$N_e = \frac{\log_{10}\left(\frac{3}{lt}\right)}{\log_{10}\left(\frac{K-n}{K}\right) \times \log_{10}\left(\frac{10}{lr}\right)} \qquad (8)$$

where lt is the actual loop times and lr represents the Local Constraint Rate calculated by:

$$lr = \frac{\text{area of the destination area}}{L} \quad (9)$$

where L is the length of the m-array.

Step 1224 sorts $r_i$ in ascending order of the number of error bits. Steps 1225, 1211 and 1212 then finds the first $r_i$ in which the corresponding X,Y position is within the destination area. Steps 1225, 1211 and 1212 finally returns the X,Y position as the result (through step 1213), or an indication that the decoding procedure failed (through step 1215).

Architecture for Determining Path of a Stroke (Strokes Localization)

Figure 15:
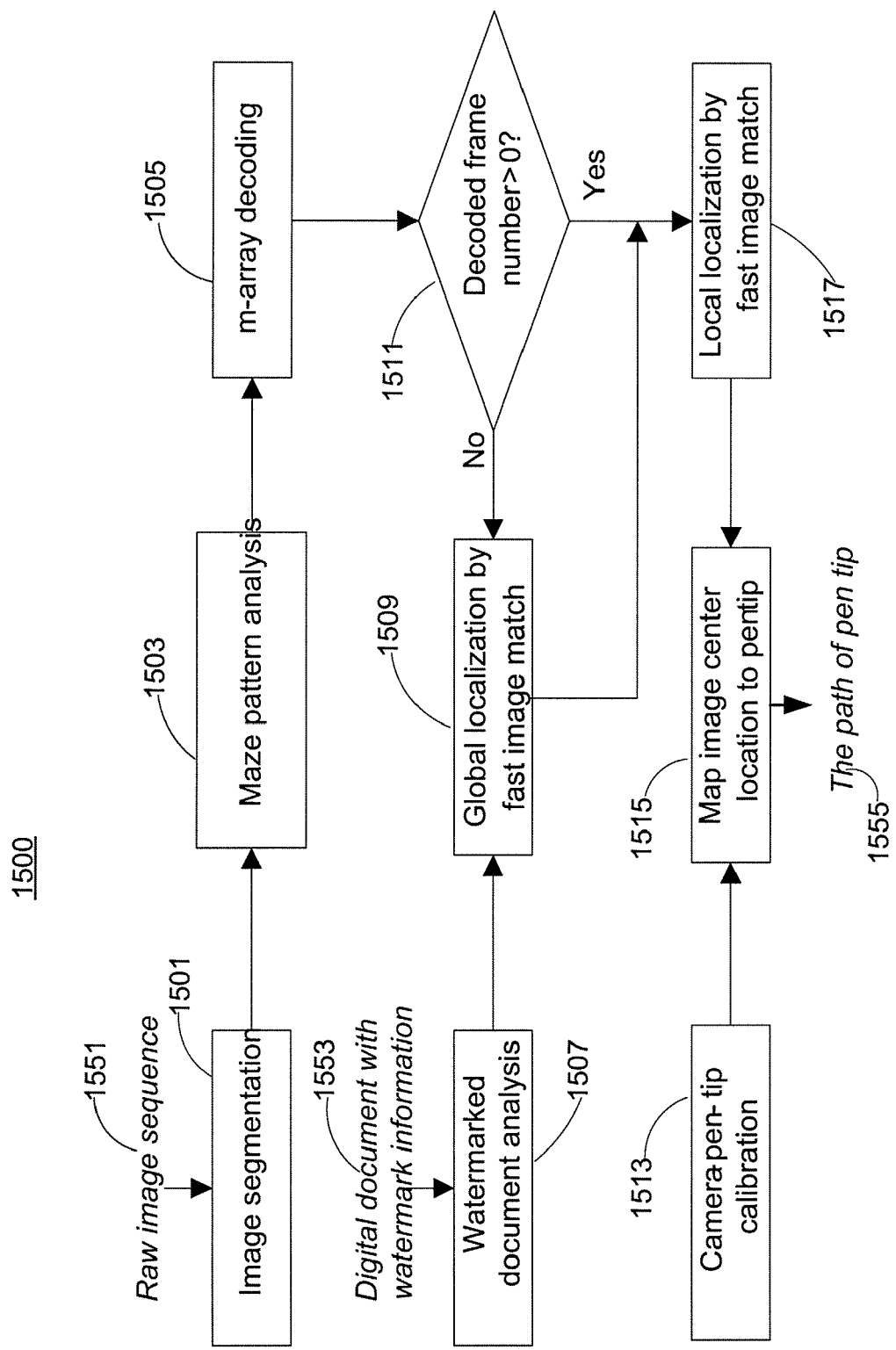
FIG. 15 shows a method for determining a path of a pen-tip from a sequence of captured frames in accordance with an embodiment of the present invention.

FIG. 15 shows a method for determining a path of a pen-tip from a sequence of captured frames 1551 in accordance with an embodiment of the present invention. In step 1501, a frame is processed so that document contents such as text are separated from other areas that contain only maze pattern cells. Also, the image (gray-scale) is normalized to compensate for non-uniform illumination. In step 1503, m-array bits are extracted from visible maze pattern bars in a frame (captured image). In step 1505, if the number of extracted bits (as determined in step 1503) is greater than the order of the embedded m-array, unique position coordinates (corresponding to the x-y position of the center of the frame) may be obtained by m-array decoding.

Step 1507 analyzes digital document 1553 in order to determine the areas of document 1553 in which the maze pattern is occluded by contents of document 1553. (With the embodiment, digital document 1553 does not include annotations generated by a user.) If maze pattern cells are occluded by the contents of document 1553, step 1505 may not be able to extract enough m-array bits to determine the x-y position of a frame. By analyzing the whole watermarked document 1553, process 1500 can ascertain the areas of document 1553 where the x-y position cannot be uniquely determined. This analysis may be used in step 1509 as will be discussed.

In step 1511, if the x-y position of any frame that is associated with a stroke cannot be determined from m-array decoding (corresponding to step 1505), process 1500 may not be able to locate the position of the frame. In such cases, step 1509 performs global localization in which captured images can be warped by an affine transform obtained by maze pattern analysis (step 1503) and then can be matched with an area of document image 1553 where a substantial amount of maze pattern cells are occluded by the content of the document. Once one frame is successfully matched, local localization (step 1517 as will be discussed) is utilized to locate the entire stroke (corresponding to a series of frames).

In step 1517, frames whose x-y positions are not decoded in step 1505 or determined by global localization in step 1509 are further processed. The location of such frames should be near the location of frames whose x-y positions are determined by m-array decoding or global localization. The location of such frames is determined by matching the frames with the neighboring area of already determined x-y positions. The perspective transform $F_{S \to P}$ (as previously discussed) between captured images and document images is also obtained.

X-y positions obtained from m-array decoding (corresponding to step 1505) and global/local localization (steps 1509 and 1517, respectively) represent the locations (x-y positions) of the centers of captured images. (An embodiment of the invention may support one, two or three dimensions. In the embodiment, two dimensions are supported so that a position location corresponds to an x-y position.) In order to obtain the x-y positions of the pen tip, a relationship between the pen tip (e.g., pen tip 202 as shown in FIG. 2) and the associated camera (e.g., camera 203 as shown in FIG. 2) may need calibration. Step 1513 supports calibration as will be discussed.

In step 1515 the x-y positions of the pen tip are determined by mapping the x-y positions of image centers using the perspective transform obtained from local localization and calibration parameters. (An example of determining a path 1555 of a pen tip is shown in FIG. 26 as will be discussed.)

Figure 16:
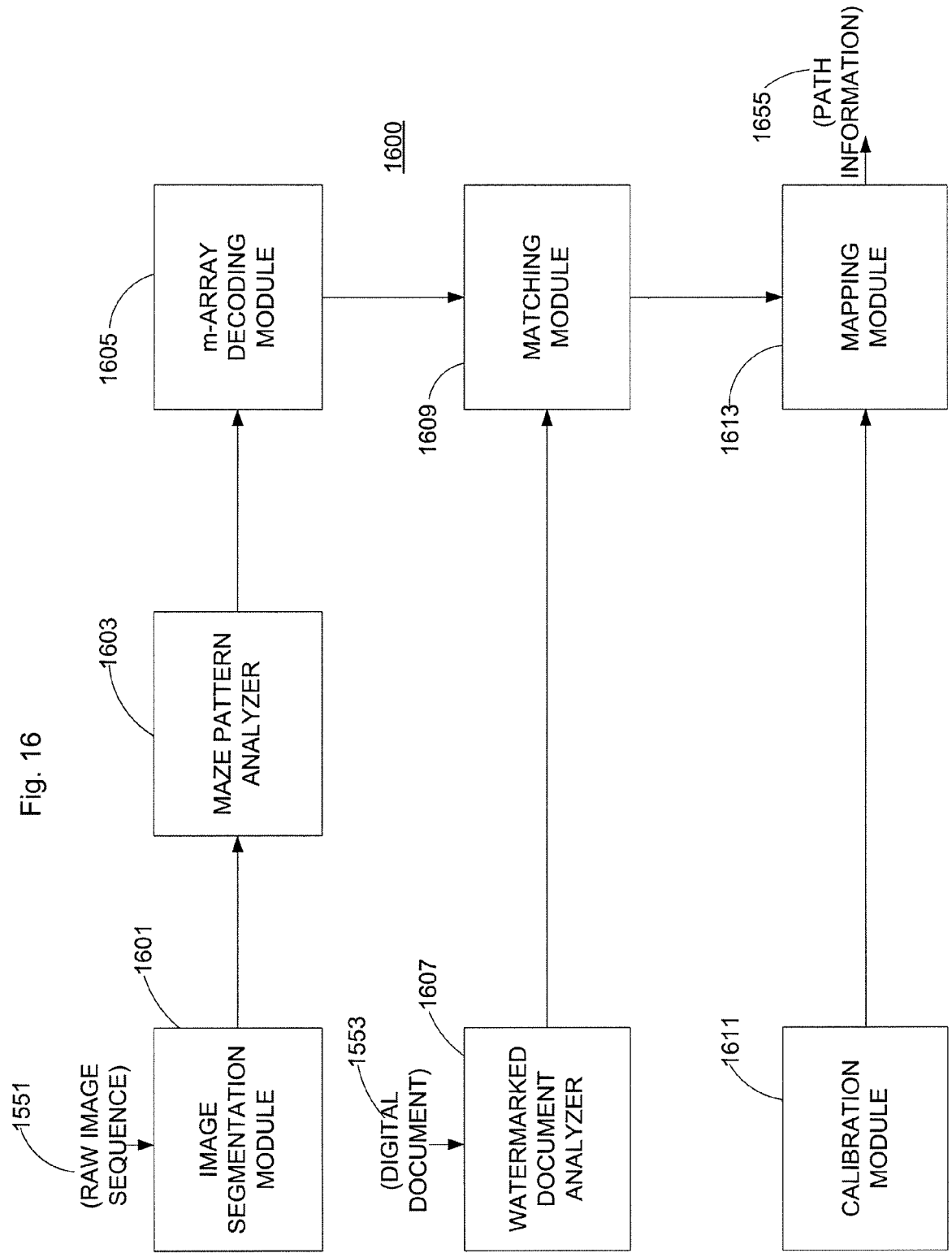
FIG. 16 shows an apparatus for determining a path of a pen-tip from a sequence of captured frames in accordance with an embodiment of the present invention.

FIG. 16 shows an apparatus 1600 for determining a path of a pen tip from a sequence of captured images (frames) in accordance with an embodiment of the present invention. In an embodiment of the invention, image segmentation 1601 performs step 1501, maze pattern analyzer 1603 performs step 1503, m-array decoding module 1605 performs step 1505, matching module 1609 performs steps 1511, 1509, and 1517, watermarked document analyzer 1607 performs step 1507, calibration module 1611 performs step 1513, and mapping module 1613 performs step 1515.

Document image analysis and calibration may be performed off-line, or separately before on-line image-capturing and processing. The other components (e.g., image segmentation module 1601, maze pattern analyzer 1603, m-array decoding module 1605, matching module 1609, and mapping module 1613) may be performed on-line or off-line. The functionality of the components is described in detail as follows.

Image Segmentation

Figure 17:
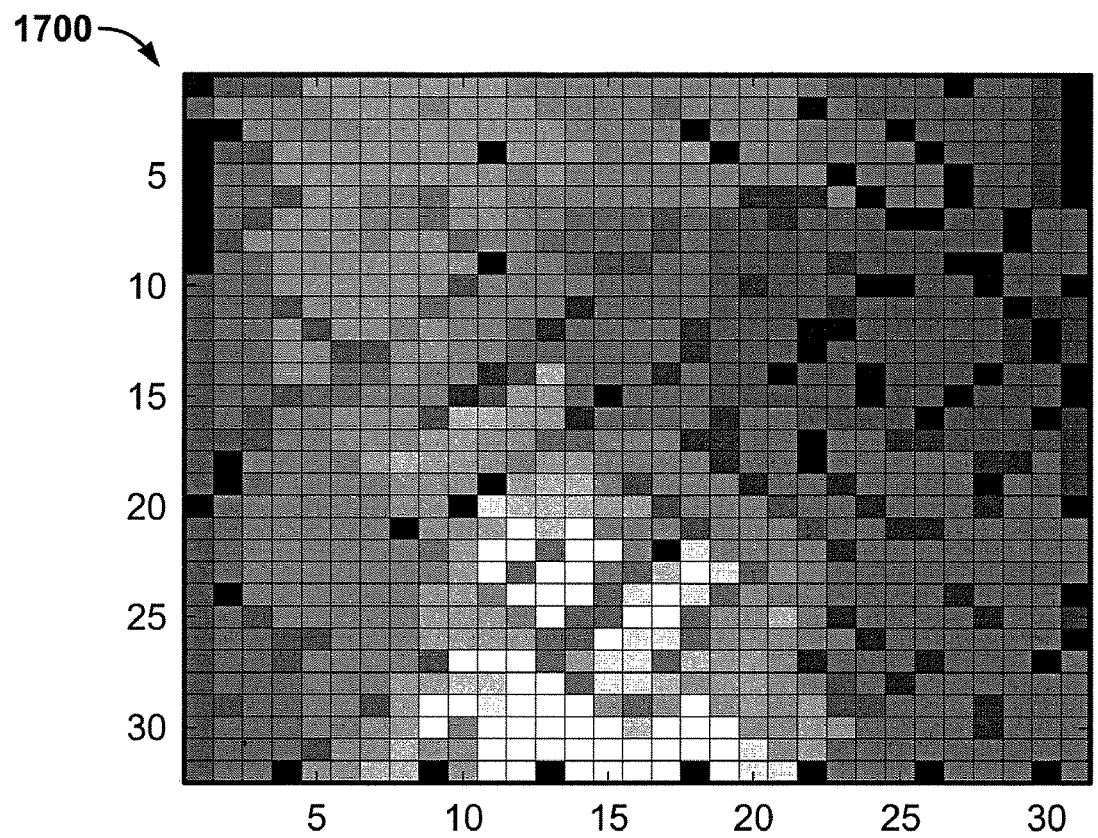
FIG. 17 shows an example of a captured image in accordance with an embodiment of the invention.
Figure 18:
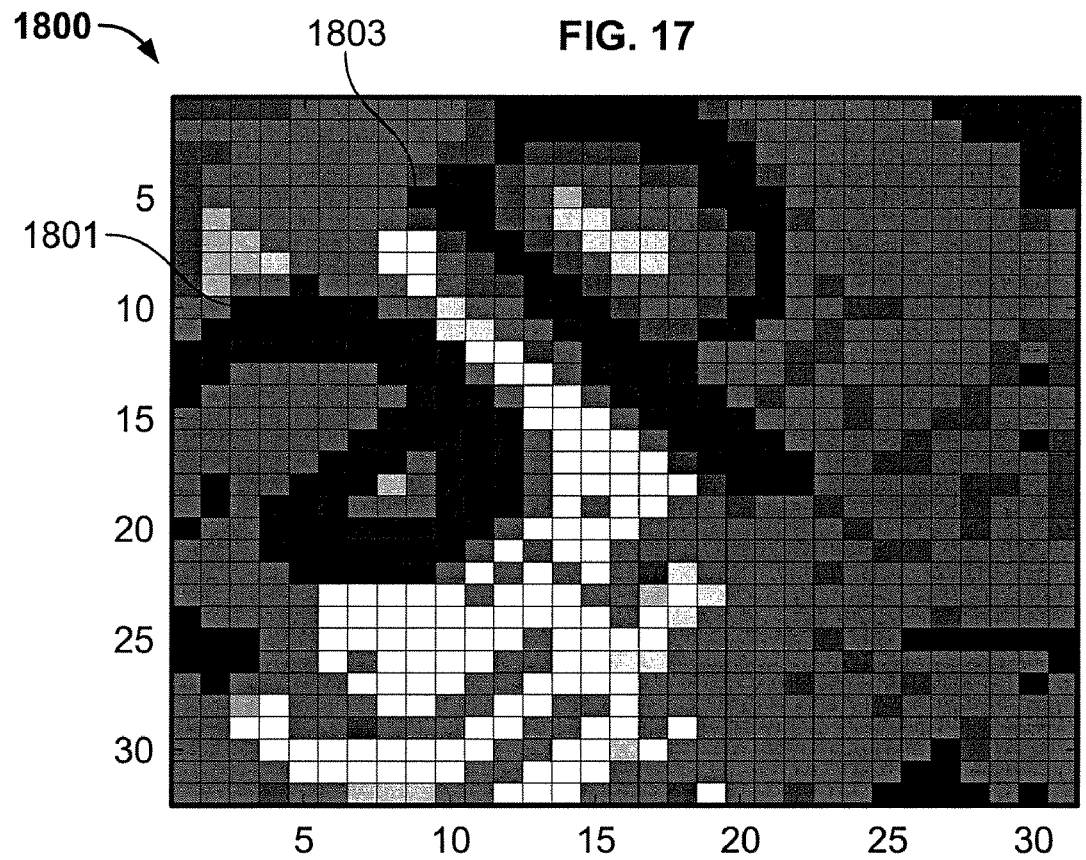
FIG. 18 shows an example of a captured image comprising a text component in accordance with an embodiment of the invention.

Captured images may contain contents of a document such as text or drawings, which are initially assessed in preprocessing. FIG. 17 shows an example of a captured image 1700 in accordance with an embodiment of the invention. FIG. 18 shows an example of a captured image comprising a text component (that includes text characters 1801 and 1803) in accordance with an embodiment of the invention. If an image contains a text/drawing area, the text/drawing area is separated from the other area that contains only maze patterns or blank pixels.

Figure 19:
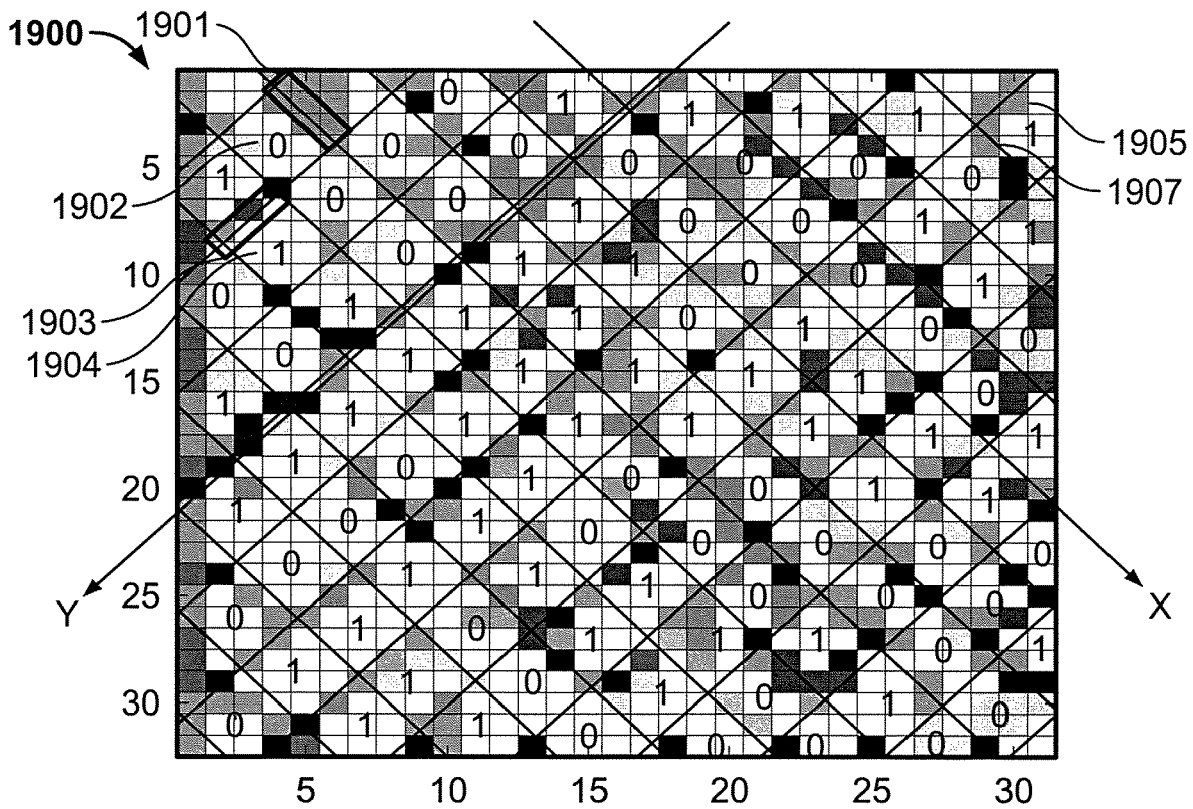
FIG. 19 shows a maze pattern analysis of a captured image in accordance with an embodiment of the invention.
Figure 20:
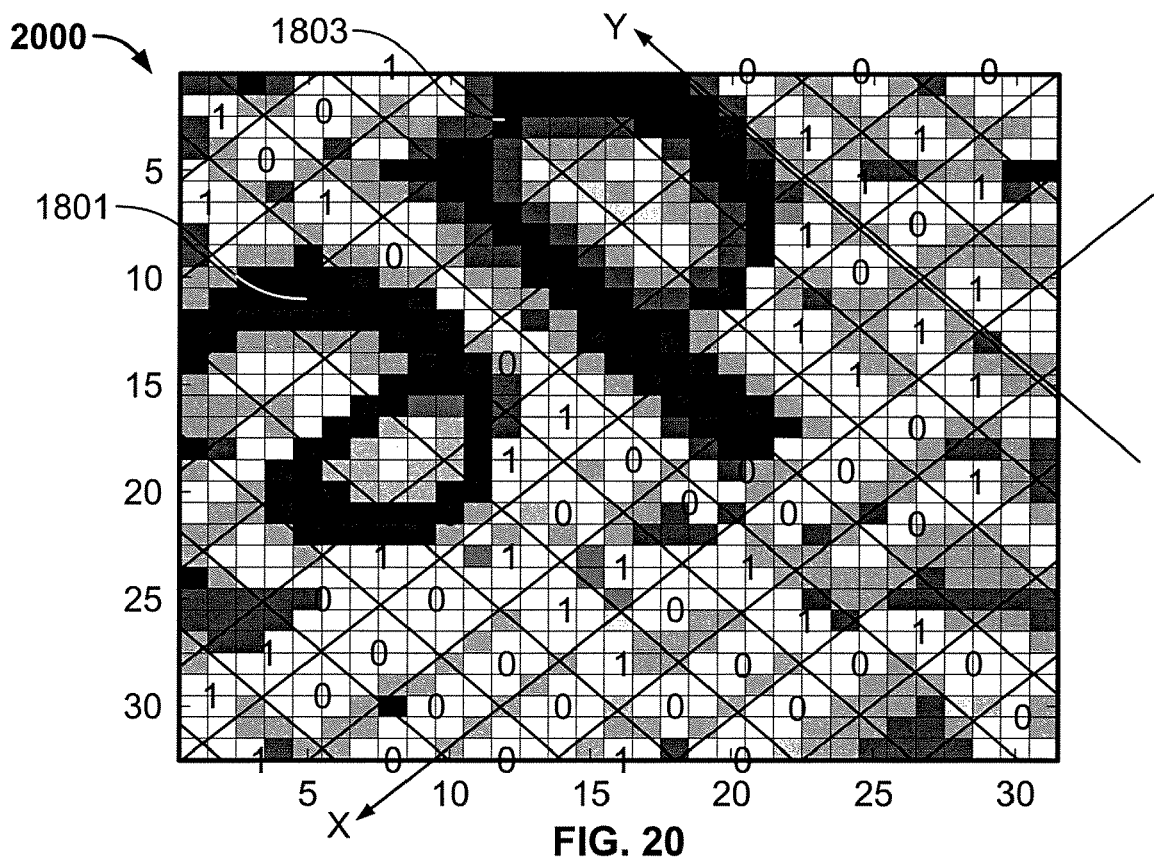
FIG. 20 shows a maze pattern analysis of a captured image comprising a text component in accordance with an embodiment of the invention.

In addition, the captured images (e.g., captured images 1700 and 1800) are normalized to compensate for the non-uniform illumination. FIG. 19 shows a processed image 1900 corresponding to a normalization of illumination of captured image 1700 (as shown in FIG. 17) in accordance with an embodiment of the invention. FIG. 20 shows a processed image 2000 corresponding to a normalization of illumination of captured image 1800 in accordance with an embodiment of the invention.

Maze Pattern Analysis

The task of maze pattern analysis is to extract m-array bits from the visible maze pattern bars (e.g., bars 401 and 402 as shown in FIG. 4A) in a captured image. FIG. 19 shows a maze pattern analysis 1900 of captured image 1700 (as shown in FIG. 17) in accordance with an embodiment of the invention. Bit 1901 (corresponding to a bit value 1902 of "0") and bit 1903 (corresponding to a bit value of 1904 of "1") are two members of the m-array bits. The m-array bits are organized in the maze pattern according to maze pattern grid lines, e.g., grid lines 1905 and 1907. FIG. 20 shows a maze pattern analysis 2000 of captured image 1800 (as shown in FIG. 18) in accordance with an embodiment of the invention. (Note that m-array bits of some of the maze pattern cells in the vicinity of text characters 1801 and 1803 may not be determined in the example.)

FIGS. 19 and 20 show an illustration of maze pattern cells and maze pattern bars. The parameters of maze pattern grid lines (scale and rotation along each dimension, i.e. affine transform) are first calculated, and then the original direction (or quadrant) in which the maze pattern is embedded is determined. Consequently, the m-array bits information is determined based on the grid lines and bar directions.

M-array Decoding

If the number of extracted bits obtained in step 1505 (as shown in FIG. 15) is greater than the order of embedded m-array, a unique x-y position may be obtained by m-array decoding.

Watermarked Document Image Analysis

Figure 21:
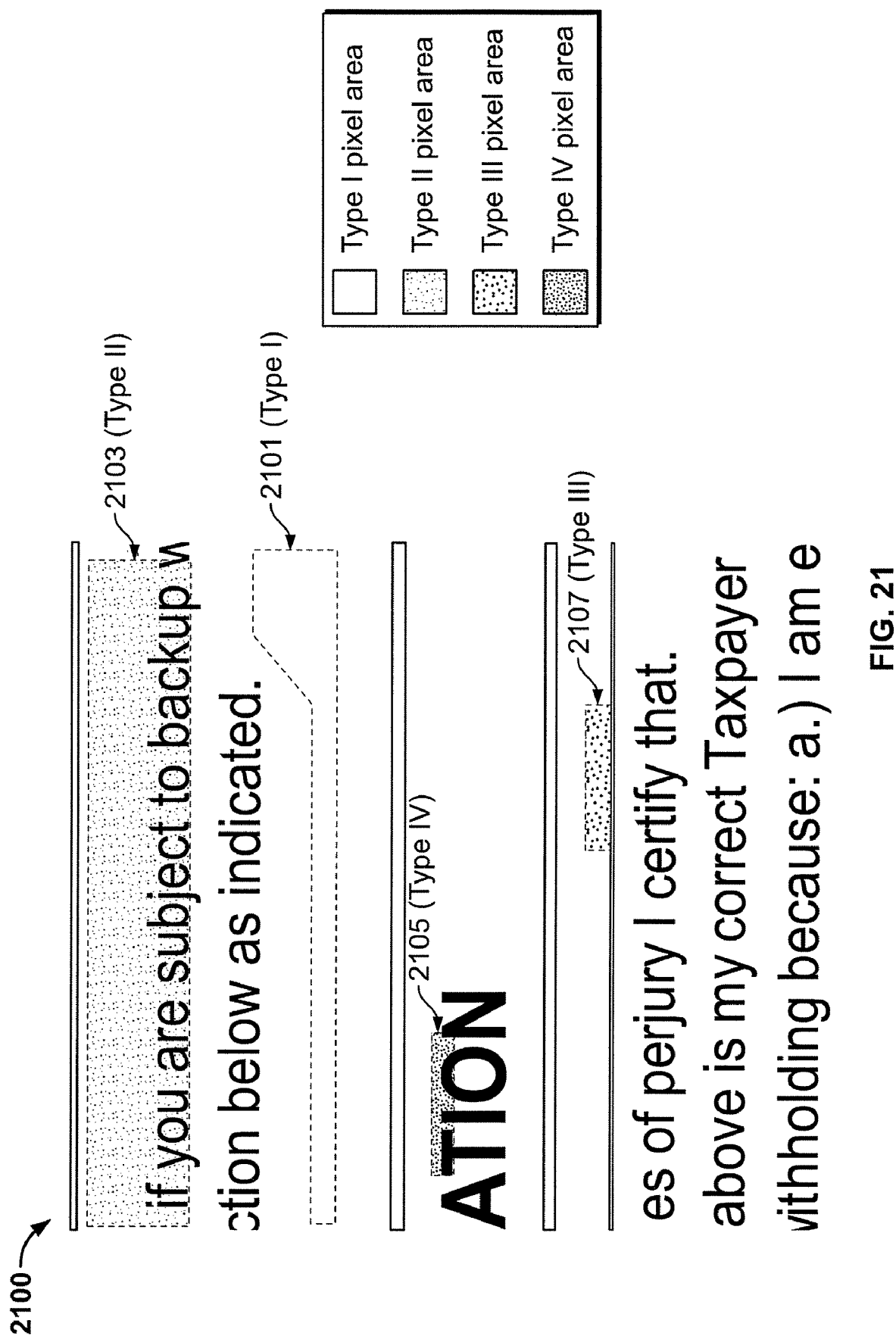
FIG. 21 shows a result of analyzing a document image in accordance with an embodiment of the invention.

Maze patterns are possibly occluded by content of the document, which means there may not be enough m-array bits that can be extracted for decoding from a captured image. By analyzing the whole watermarked document image, process 1500 or apparatus 1600 can determine in which area where the x-y position can be uniquely determined and in which area where x-y position cannot be uniquely determined. The analysis result is used in the global localization. FIG. 21 shows a result 2100 of analyzing a document image 1553 in accordance with an embodiment of the invention. In the embodiment, pixels on document images (e.g., document 1553) are labeled as one of four types. Pixels are labeled according to the following association:

Type I: 32 by 32 pixel neighboring window (with the pixel under consideration as the center) contains only maze pattern cells Type II: 32 by 32 pixel neighboring window contains 60 or more maze pattern cells Type III: 32 by 32 pixel neighboring window contains 36 to 60 maze pattern cells Type IV: 32 by 32 pixel neighboring window contains 35 or less maze pattern cells In the embodiment, the x-y position of a captured image can be determined if the center of a captured image is located in type I or type II areas and may be determined if the center is located in a type III area. In FIG. 21, area 2101 corresponds to a type I pixel area, area 2103 corresponds to a type II pixel area, area 2107 corresponds to a type III pixel area, and area 2105 corresponds to a type IV pixel area. (The entire document is analyzed and labeled but only a portion is shown in FIG. 21.)

In the embodiment, process 1500 may obtain digital document 1553 by rendering an electronic document to a bitmap or by scanning a paper document and then re-sampling the corresponding bitmap to an appropriate resolution. Determination of the resolution is based on the following considerations: (1) the resolution of the document image shouldn't be less than that of the captured image, because the watermarked gray-scale document image will be matched with a camera-captured image in order to determine the location of the captured image; (2) one printed maze pattern cell should be mapped to an integer number of document image pixels so that the matching algorithm can work more effectively. For example, if the resolution of the camera is 0.15 mm/pixel, i.e., 0.15 mm in the physical world is mapped to one camera pixel, the printed maze pattern cell size is 0.45 mm*0.45 mm, i.e., a printed maze pattern cell is mapped to 3*3 pixels on the camera sensor, the resolution of the document image should also be set to 0.15 mm/pixel so that a printed maze pattern cell will be mapped to a 3*3 pixel area in the document image.

Global Localization by Fast Image Match

If the x-y positions of the captured images of a stroke fail to be determined from m-array decoding, it is predictable that the centers of all images are located at the area where x-y position cannot be uniquely determined. In this case, the captured images are warped by affine transform obtained by maze pattern analysis, and then are matched with the area of document image where x-y position cannot be uniquely determined. Once one frame is matched successfully, the local localization algorithm is used to locate the whole stroke.

With document 1553 (as shown in FIG. 15), the number of visible maze pattern cells in a 32 by 32 pixel sub-window typically varies from 10 to 100. Pixels in the document are labeled with one of four types by watermarked document analysis (step 1507 as shown in FIG. 15). A search region is set as the collection of type III and type IV areas.

Figure 22:
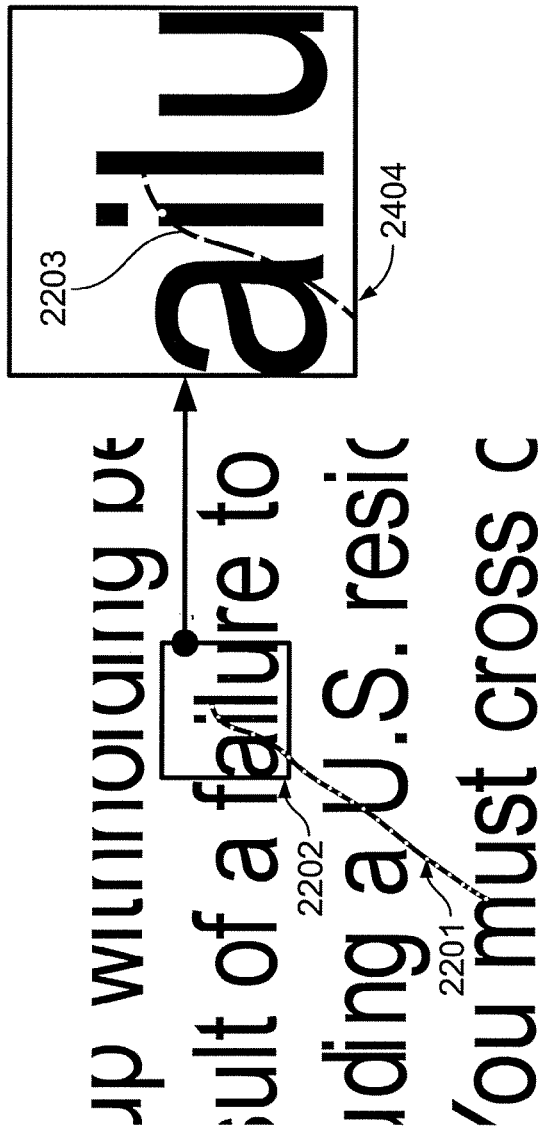
FIG. 22 shows a result of a global localization for an exemplary stroke in accordance with an embodiment of the invention.

FIG. 22 shows a result of a global localization for an exemplary stroke 2201 in accordance with an embodiment of the invention. The x-y position of the point 2203 on stroke 2201 is determined by global localization (corresponding to step 1509). Portion 2202 of a document is magnified to magnified portion 2204 to better show point 2203 on stroke. (In the embodiment, only one point on stroke 2201 is determined by global localization, and the remaining points are determined by local localization.)

With global localization, a frame is matched with the document image at select points of the search region. The original frame may be warped (transformed) by the scale and rotation (affine transform) from maze pattern analysis (corresponding to step 1503 as shown in FIG. 15). An offset may be useful for determining select points in matching a frame.

In the embodiment, the success of matching a frame corresponds to the largest cross-correlation value between the captured image and the document image. (The cross-correlation value varies between 0 to 1.) The largest cross-correlation value should be sufficiently larger than other cross-correlation values and the threshold, i.e., how much larger, may be determined by off-line training. For example, global localization may require that the difference between the highest cross-correlation value and the second highest cross-correlation value be larger than 0.1.

Local Localization by Fast Image Match

For those frames which x-y positions are not decoded/determined by m-array decoding/global localization, the locations should be near the locations of the frames where x-y positions are determined. Consequently, the corresponding locations are determined by matching the images with the neighbor areas of already determined x-y positions. The perspective transform between captured images and document images is also obtained.

Figure 23:
FIG. 23 shows a result of a local localization for an exemplary stroke in accordance with an embodiment of the invention.

FIG. 23 shows a result of a local localization for an exemplary stroke 2301 in accordance with an embodiment of the invention. The location positions of a subset of points (e.g., points 2305*a* and 2305*b*) on stroke 2301 are determined by m-array decoding and the positions of the remaining points (e.g., points 2303*a* and 2303*b*) are determined by local localization.

In the embodiment, local localization utilizes start points and pivotal start points. Start points are the location of frames which are successfully located by m-array decoding (corresponding to step 1505 as shown in FIG. 15) or by global localization (corresponding to step 1509 as shown in FIG. 15). A frame sequence is segmented into segments in which a local search is performed segment by segment. A segment may be split into several segments during a local localization. In the embodiment, a local search is restricted to be within a search region that is based upon a pen tip's motion restrictions of velocity and acceleration.

The following procedure depicts an embodiment for local localization:

Frame sequence segmentation (a) Select pivotal start points

The first and the last start point in a stroke are pivotal start points.

For the start points between two pivotal start points $p_1$, $p_2$, the one with the maximum distance $D_{max}$ to the line L that passes through $p_1$, $p_2$, and $D_{max}$ that is larger than a threshold (typically set at 0.5), is a pivotal start point.

(b) Refine the perspective transform at pivotal start points

Get more accurate perspective transform by comparing the camera-captured image with the document image.

(c) Segment the frame sequence by pivotal start points

Every segment starts from a pivotal start point or the first point of the stroke and ends at a pivotal start point or the last point of the stroke.

Determine finished segment

A segment is declared a finished segment when:

(a) There is at least one start point in this segment which is not a pivotal start point, i.e., no more pivotal start points can be found for this segment or in other words, the segment is very much like a straight line. In this case, all the points are interpolated and the segment is declared finished.

or (b) For every point in the segment, the corresponding frame has been processed.

Find a search region for a frame of unfinished segment (a) The first point of the segment is a start point, and need not be processed.

(b) For the second point of the segment, the center of the search region is set to be the first point, and the size of search region is restricted by maximal velocity.

(c) For other points of the segment, the velocity at previous point that has been processed can be estimated. The center of the search region can be calculated from the location and velocity of the previous point, and the size of search region is restricted by maximal acceleration.

Template match in search region

This step is based on the assumption that there is only a little change of a pen's pose in a short period of time, which means that there is only a little difference of the perspective transform between adjacent frames.

(a) Warp the frame by the perspective matrix of previous processed frame.

(b) Determine the cross-correlation at every point of the search region by matching the frame with the document image with the point as the center.

(c) The point with maximum cross-correlation should be the correct location of this frame.

Refine perspective transform for the point

Refine the perspective transform by comparing the camera captured image with the document image.

Prune the search result

Several factors may cause error results to be obtained, such as incorrect initial perspective transform parameters and motion blur. By the motion restriction of velocity and acceleration, one can prune the error results.

(a) All the start points should not be pruned.

(b) Go through the whole stroke from the first point to the last point. If a point cannot satisfy the motion restriction with the previous points, then this point must be wrong and should be pruned.

(c) Go though the whole stroke from the last point to the first point. If a point cannot satisfy the motion restriction with the previous points, then this point must be wrong and should be pruned.

(d) After the pruning, points kept in the stroke are correct points. The pruned points are replaced by points determined from interpolation.

Camera-pen-tip Calibration

X-y positions obtained from m-array decoding and global/local localization represents the locations of the centers of captured images. To obtain the x-y positions of pen tip 202, the relationship between pen tip 202 and the center of camera 203 needs to be calibrated. Fast and accurate calibration is significant since ink cartridges may be changed frequently.

By touching the pen-tip at a fixed contact point on the writing surface in different postures, a few images are captured. The calibration parameters are determined by using the constraint that all x-y positions of these images should be mapped to the same point (the fixed contact point) by correct calibration parameters.

In the embodiment, the following procedure is used for calibrating a pen tip. The procedure is used to estimate the calibration parameter $L_{virtual\text{-}pentip}$:

a) Place the real pen tip at a fixed location $L_{pentip}$ on paper b) Keep the pen tip at the location $L_{pentip}$ standing, and capture a series of images with different pen poses.

c) For each captured image, the transform $F_{S \to P}$ (which transforms the position coordinates in the image captured by camera to position coordinates in the real image on the paper) and $F_{P \to S} = F_{S \to P}^{-1}$ (the reverse of $F_{S \to P}$) is calculated by maze pattern analysis, m-array decoding and matching the captured image with the document image, then:

$$L_{pentip}^{i} = F_{S \to P}^{i} \cdot L_{virtual\text{-}pentip}, \, i=1,2,\ldots,N$$

$$L_{virtual\text{-}pentip}^{i} = F_{P \to S}^{i} \cdot (L_{pentip} + \Delta L_i), \, i=1,2,\ldots,N$$

where N is the number of captured images in the experiment, and $\Delta P_i$ is the offset between the actual pen tip location in $i^{th}$ frame and $L_{pentip}$.

d) Initialize $\overline{L}_{virtual\text{-}pentip}$ as $(0, 0)$, where $\overline{L}_{virtual\text{-}pentip}$ is the estimated value of $L_{virtual\text{-}pentip}$.

e) Using the first equation in (c), set $L_{virtual\text{-}pentip}$ as $\overline{L}_{virtual\text{-}pentip}$ to get $L_{pentip}^{i}$, i=1,2, . . . ,N. By averaging $L_{pentip}^{i}$, $L_{pentip}$ is estimated as:

$$\overline{L}_{pentip} = \frac{1}{N}\sum_{i=1}^{i=N} L_{pentip}^{i}$$

f) Using the second equation in (c), set $L_{pentip}$ as $\overline{L}_{pentip}$ to get $L_{virtual\text{-}pentip}^{i}$, i=1,2, . . . ,N. By averaging $L_{virtual\text{-}pentip}^{i}$, $L_{virtual\text{-}pentip}$ is estimated as:

$$\overline{L}_{virtual-pentip} = \frac{1}{N}\sum_{i=1}^{i=N} L_{virtual-pentip}^{i}$$

g) Repeat step e. After several iterations, $L_{virtual\text{-}pentip}$ and $L_{pentip}$ will converge respectively to substantially more accurate results, which may be referred to as $L_{virtual\text{-}pentip}^{accurate}$ and $L_{pentip}^{accurate}$.

Finally, one obtains $L_{virtual\text{-}pentip}^{accurate}$ as the calibration parameter $L_{virtual\text{-}pentip}$.

Map Images' Center Position to Pen Tip

X-y positions of pen tip 202 are determined by mapping the x-y positions of image centers using the perspective transform obtained from local localization and calibration parameters. FIGS. 24 and 25 illustrate the result of pen tip calibration of an example. FIG. 26 shows a recovered stroke 2401 of pen tip 202 in accordance with an embodiment of the invention. FIG. 25 shows an actual stroke 2501 that is associated with the recovered stroke as shown in FIG. 24. Stroke 2403 in FIG. 24 shows the path of the locations of the center of the captured images. That is, without calibration, stroke 2501 may be wrongly recovered (recovered as stroke 2403), whereas with proper calibration, stroke 2501 is correctly recovered (recovered as stroke 2401).

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

We claim:

1. A method for determining a path of a pen tip of a pen within a document, the method comprising:
   (A) calibrating the pen in order to obtain a calibration parameter;
   (B) analyzing a watermarked document image in order to determine areas where x-y positions cannot be uniquely determined by m-array decoding;
   (C) segmenting a maze pattern from an obstruction component of a captured image, wherein the obstruction component comprises document content that occludes the maze pattern;
   (D) analyzing the maze pattern to extract bits from the maze pattern of the captured image;
   (E) in response to (D), determining a transform that transforms image position coordinates to actual position coordinates, wherein the actual position coordinates identify a location of the pen tip in relation to the document;
   (F) decoding the extracted bits associated with the captured image;
   (G) in response to (F), if the image position coordinates of the captured image cannot be determined, matching the captured image with image information, comprising:
      (i) warping the captured image to create a warped image; and
      (ii) matching the warped image with an area of the document, where a corresponding x-y position cannot be uniquely determined by m-array decoding;
   (H) determining image position coordinates of other image frames that are associated with a pen stroke, comprising:
      (i) matching a corresponding captured image with a neighboring area of the image position coordinates of an image whose image position coordinates have been determined previously; and
      (ii) repeating (i) until all image frames of the pen stroke are processed; and
   (I) mapping the path of the pen tip from the transform, the calibration parameter, and the image position coordinates.

2. The method of claim 1, wherein the transform is a perspective transform obtained from local localization.

3. The method of claim 1, wherein calibrating the pen tip comprises:
   fixing the pen tip at a contact point on the document;
   changing a position of a pen camera center; and
   mapping the position of the pen camera center to the contact point.

4. The method of claim 1, wherein the calibration parameter is indicative of a virtual pen tip position.

5. The method of claim 1, further comprising,
   processing the extracted bits to determine whether the extracted bits contain at least one error bit.

6. The method of claim 1, wherein the document is a paper document.

7. The method of claim 1, wherein the document is an electronic document.

8. A computer-readable storage medium having computer-executable instructions for performing a method for determining a path of a pen tip of a pen within a document, the method comprising:
   calibrating the pen in order to obtain a calibration parameter; analyzing a watermarked document image in order to determine areas where x-y positions cannot be uniquely determined by m-array decoding; segmenting a maze pattern from an obstruction component of a captured image,
   wherein the obstruction component comprises document content that occludes the maze pattern;
   analyzing the maze pattern to extract bits from the maze pattern of the captured image;

in response to analyzing the maze pattern, determining a transform that transforms image position coordinates to actual position coordinates, wherein the actual position coordinates identify a location of the pen tip in relation to the document; decoding the extracted bits associated with the captured image;

in response to decoding the extracted bits, if the image position coordinates of the captured image cannot be determined, matching the captured image with image information, comprising: warping the captured image to create a warped image; and matching the warped image with an area of the document, where a corresponding x-y position cannot be uniquely determined by m-array decoding;

determining image position coordinates of other image frames that are associated with a pen stroke, comprising:

matching a corresponding captured image with a neighboring area of the image position coordinates of an image whose image position coordinates have been determined previously; and repeating the matching of the corresponding captured image with neighboring areas until all image frames of the pen stroke are processed; and mapping the path of the pen tip from the transform, the calibration parameter, and the image position coordinates.

9. The computer-readable storage medium of claim 8, wherein the transform is a perspective transform obtained from local localization.

10. The computer-readable storage medium of claim 8, wherein calibrating the pen tip comprises:

fixing the pen tip at a contact point on the document;
changing a position of a pen camera center; and
mapping the position of the pen camera center to the contact point.

11. The computer-readable storage medium of claim 8, wherein the calibration parameter is indicative of a virtual pen tip position.

12. The computer-readable storage medium of claim 8, further comprising, processing the extracted bits to determine whether the extracted bits contain at least one error bit.

13. The computer-readable storage medium of claim 8, wherein the document is a paper document.

14. The computer-readable storage medium of claim 8, wherein the document is an electronic document.

* * * * *